United States Patent
Dorsey et al.

(10) Patent No.: US 9,449,321 B2
(45) Date of Patent: Sep. 20, 2016

(54) TRANSFERRING MONEY USING EMAIL

(71) Applicant: Square, Inc., San Francisco, CA (US)

(72) Inventors: Jack Dorsey, San Francisco, CA (US); Jesse Wilson, Waterloo (CA); Brian Grassadonia, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/260,241

(22) Filed: Apr. 23, 2014

(65) Prior Publication Data

US 2014/0279446 A1 Sep. 18, 2014

Related U.S. Application Data

(63) Continuation-in-part of application No. 14/066,991, filed on Oct. 30, 2013, which is a continuation of application No. 13/839,623, filed on Mar. 15, 2013, now Pat. No. 8,606,703.

(51) Int. Cl.
*G06Q 40/00* (2012.01)
*G06Q 20/10* (2012.01)
(Continued)

(52) U.S. Cl.
CPC ............ *G06Q 20/42* (2013.01); *G06Q 10/107* (2013.01); *G06Q 20/023* (2013.01); *G06Q 20/10* (2013.01); *G06Q 40/02* (2013.01)

(58) Field of Classification Search
CPC .. G06Q 20/10; G06Q 10/107; G06Q 20/102; G06Q 40/02
USPC .......................................................... 705/39
See application file for complete search history.

(56) References Cited

U.S. PATENT DOCUMENTS 6,049,785 A 4/2000 Gifford
D459,730 S 7/2002 Lee
(Continued)

FOREIGN PATENT DOCUMENTS

CA 2 332 656 A1 7/2002
CA 2 740 206 A1 2/2010
(Continued)

OTHER PUBLICATIONS

Anonymous: "Ask Dr Dedupe: A . . . NetApp Community" Published Sep. 8, 2009. Retrieved on Jul. 7, 2014. Retrieved from the Internet: URL:<https://communities.netapp.com/community/netapp-blogs/drdedupe/blog/authors/parks?start=45>.
(Continued)

*Primary Examiner* — Jagdish Patel
(74) *Attorney, Agent, or Firm* — Perkins Coie LLP

(57) ABSTRACT

Methods, systems, and apparatus, including computer programs encoded on computer storage media, for transferring money using email. One of the methods includes receiving, at a user device, user input of a request to transfer a payment amount from a recipient account with a payment service system to a sender account of a sender with the payment service system. A draft email message is generated, the message having content identifying the requested payment amount, the draft email message including a confirmation link to a network resource associated with the payment service system, wherein upon receiving an indication that the recipient selected the confirmation link, the payment service system identifies a sender account of the sender and a recipient account of the recipient and initiates a transfer of the requested payment amount from the recipient account to the sender account.

10 Claims, 17 Drawing Sheets

(51) Int. Cl.
*G06Q 40/02* (2012.01)
*G06Q 10/10* (2012.01)
*G06Q 20/42* (2012.01)
*G06Q 20/02* (2012.01)

(56) References Cited

U.S. PATENT DOCUMENTS

| | | | |
|---|---|---|---|
| 7,194,437 | B1 | 3/2007 | Britto et al. |
| 7,376,587 | B1 | 5/2008 | Neofytides et al. |
| 7,533,064 | B1 | 5/2009 | Boesch |
| 7,587,342 | B2 | 9/2009 | Neofytides et al. |
| 7,606,734 | B2 | 10/2009 | Baig et al. |
| 7,610,222 | B2 | 10/2009 | Neofytides et al. |
| 7,778,890 | B1 | 8/2010 | Bezos et al. |
| D624,930 | S | 10/2010 | Agnetta et al. |
| 7,848,980 | B2 | 12/2010 | Carlson |
| D640,277 | S | 6/2011 | Woo |
| 8,255,983 | B2 | 8/2012 | Schultz et al. |
| 8,346,659 | B1 | 1/2013 | Mohsenzadeh |
| 8,386,498 | B2 * | 2/2013 | Whitehouse ........ H04L 63/1425 707/741 |
| 8,401,009 | B1 | 3/2013 | Dorsey et al. |
| 8,447,693 | B2 | 5/2013 | Lynch et al. |
| 8,500,018 | B2 | 8/2013 | McKelvey et al. |
| 8,573,486 | B2 | 11/2013 | McKelvey et al. |
| 8,606,703 | B1 | 12/2013 | Dorsey et al. |
| D705,806 | S | 5/2014 | Jung |
| D707,248 | S | 6/2014 | Jung et al. |
| 8,751,379 | B1 | 6/2014 | Bueche, Jr. |
| 8,762,272 | B1 * | 6/2014 | Cozens ................. G06Q 20/10 705/40 |
| 8,870,070 | B2 | 10/2014 | McKelvey et al. |
| 8,893,296 | B2 | 11/2014 | Dumais et al. |
| 9,016,572 | B2 | 4/2015 | Babu et al. |
| 9,047,600 | B2 | 6/2015 | Zhou et al. |
| 9,064,252 | B2 | 6/2015 | Randazza et al. |
| D737,852 | S | 9/2015 | De La Rosa et al. |
| 9,202,207 | B2 | 12/2015 | Dorsey et al. |
| 2007/0255653 | A1 | 11/2007 | Tumminaro et al. |
| 2009/0132423 | A1 | 5/2009 | Liu |
| 2010/0042538 | A1 | 2/2010 | Dheer et al. |
| 2010/0191653 | A1 | 7/2010 | Johnson et al. |
| 2010/0306099 | A1 | 12/2010 | Hirson et al. |
| 2011/0055077 | A1 | 3/2011 | French et al. |
| 2011/0137789 | A1 | 6/2011 | Kortina et al. |
| 2011/0208653 | A1 | 8/2011 | Landesmann |
| 2011/0250909 | A1 | 10/2011 | Mathias et al. |
| 2011/0313921 | A1 | 12/2011 | Dheer et al. |
| 2011/0320343 | A1 | 12/2011 | Koh et al. |
| 2012/0054102 | A1 | 3/2012 | Schwartz et al. |
| 2012/0158589 | A1 | 6/2012 | Katzin et al. |
| 2012/0209970 | A1 | 8/2012 | Scipioni et al. |
| 2012/0239417 | A1 | 9/2012 | Pourfallah et al. |
| 2012/0246079 | A1 | 9/2012 | Wilson et al. |
| 2012/0253852 | A1 | 10/2012 | Pourfallah et al. |
| 2012/0310830 | A1 | 12/2012 | Paulsen et al. |
| 2012/0323978 | A1 | 12/2012 | Rooyen et al. |
| 2013/0006848 | A1 | 1/2013 | Kuttuva |
| 2013/0060689 | A1 | 3/2013 | Oskolkov et al. |
| 2013/0060708 | A1 | 3/2013 | Oskolkov et al. |
| 2013/0325705 | A1 | 12/2013 | Laird et al. |
| 2013/0325709 | A1 | 12/2013 | Pollin et al. |
| 2014/0108247 | A1 | 4/2014 | Artman et al. |
| 2014/0129428 | A1 | 5/2014 | Tyler et al. |
| 2014/0156512 | A1 | 6/2014 | Rahman et al. |
| 2014/0244506 | A1 | 8/2014 | Gramling |
| 2014/0279444 | A1 | 9/2014 | Kassemi et al. |
| 2014/0372318 | A1 | 12/2014 | Bonestell et al. |
| 2015/0127530 | A1 | 5/2015 | Wick et al. |
| 2015/0242663 | A1 | 8/2015 | Babu et al. |
| 2015/0278799 | A1 | 10/2015 | Palanisamy |

FOREIGN PATENT DOCUMENTS

| | | |
|---|---|---|
| JP | 2007-317173 | 12/2007 |
| KR | 10-2009-0036165 | 4/2009 |
| WO | WO 2011081952 | 7/2011 |

OTHER PUBLICATIONS

European Search Report in European Patent Application No. EP 14 15 5428, filed Feb. 17, 2014. Received Jul. 17, 2014. 5 pages.

Fowler, Janet. "8 Low-Cost Ways to Transfer Money." Published Apr. 21, 2011. Retrieved on Jul. 8, 2014. Retrieved from the Internet: URL:<http://www.investopedia.com/financialedge/0411/7-low-cost-ways-to-transfer-money.aspx>. 3 pages.

Kitterman, Agari S. "Sender Policy 1-14 Framework (SPF) Authentication Failure Reporting Using the Abuse Reporting Format; rfc6652.txt". Published by Internet Society (ISOC). Geneva, Switzerland. Published Jun. 25, 2012. pp. 1-8.

Klensin, J. "RFC 5321—Simple Mail Transfer Protocol". Published Oct. 2008. Retrieved on Jul. 7, 2014. Retrieved from the Internet: URL:<http://tools.ietf.org/html/rfc5321>. 190 pages.

Moosberg, Walt. "The Money Is in the Email." All things D. Published Oct. 15, 2013. Retrieved on Jul. 8, 2014. Retrieved from the Internet: URL:<http://allthingsd.com/?p=365900&ak_action=printable>.

Schreiber, Danny. "You've got Dwolla!' —Cash transfer startup rolls out email option—Silicon Prairie News". Silicon Prairie News. Published Jan. 11, 2011. Retrieved on Jul. 8, 2014. Retrieved from the Internet: URL:<http://www.siliconprairienews.com/2011/01/you-ve-got-dwolla-cash-transfer-startup-rolls-out-email-option>. 5 pages.

Mohammed E-Q., "The Hawala System," Finance and Development, Dec. 2002, vol. 39, No. 4, pp. 1-5, Retrieved from the Internet URL: http://www.gdrc.org/icm/hawala.html.

Non-Final Office Action mailed Jul. 8, 2013 for U.S. Appl. No. 13/839,623 of Dorsey, J. et al., filed Mar. 15, 2013.

Notice of Allowance mailed Oct. 18, 2013 for U.S. Appl. No. 13/839,623 of Dorsey, J. et al., filed Mar. 15, 2013.

Patent Examination Report No. 1 mailed on Apr. 7, 2014 in corresponding Australian Patent Application No. 2014201444 of Dorsey, J. et al., filed Mar. 13, 2014.

Notice of Acceptance mailed on Jul. 2, 2014 in corresponding Australian Patent Application No. 2014201444 of Dorsey, J. et al., filed Mar. 13, 2014.

Non-Final Office Action mailed Jul. 10, 2014 for U.S. Appl. No. 14/272,367 of Dorsey, J. et al., filed May 7, 2014.

Office Action mailed on Aug. 8, 2014 in corresponding European Patent Application No. 14 155 428.7 of Dorsey, J. et al., filed Feb. 17, 2014.

Office Action mailed on Nov. 13, 2014 in corresponding Canadian Patent Application No. 2,845,817 of Dorsey, J. et al., filed Mar. 12, 2014.

Non-Final Office Action mailed Nov. 17, 2014 for U.S. Appl. No. 14/066,991 of Dorsey, J. et al., filed Oct. 30, 2013.

Final Office Action mailed Nov. 20, 2014 for U.S. Appl. No. 14/272,367 of Dorsey, J. et al., filed May 7, 2014.

Electronic Funds Corporation. Introduction to ACH Processing—"Processing Your Funds at the Speed of Light". Publication date unknown. Accessed Mar. 25, 2013. Retrieved from the Internet: URL: http://www.achnetwork.com/introtoach.html>, 1 page.

Lomas, Natasha. *Amex Launches Pay by Tweet, Turns Purchases Into Adverts*. Tech Crunch. Published Feb. 12, 2013. Accessed Mar. 25, 2013. Retrieved from the Internet: URL< http:techcrunch.com/2013/02/12/amex-pay-by-tweet/>, 6 pages.

Kim, Ryan. *Chirpify Turns Twitter Into a Payment and Commerce Platform*. Gigaom. Published Feb. 15, 2012. Accessed Mar. 25, 2013. Retrieved from the Internet: URL:http://gigaom.com/2012/02/15/chirpify-turns-twitter-into-a-payment-and-commerce-platform/>, 4 pages.

Chirpify.com. Homepage. Publication date unknown. Accessed Mar. 25, 2013. Retrieved from the Internet: URL: < https://chirpify.com/>, 13 pages.

(56) References Cited

OTHER PUBLICATIONS

Interac e-Transfer. Interac. Publication date unknown. Accessed Mar. 25, 2013. Retrieved from the Internet: URL< http://www.interac.ca/index.php/en/interac-etransfer/etransfer-detail>, 3 pages.
Geffner, Marcie. *Swipe! How Do Debit Cards Work?* Bankrate.com. Published Dec. 12, 2012. Accessed Mar. 25, 2013. Retrieved from the Internet: URL: http://www.bankrate.com/finance/banking/how-do-debit-cards-work.aspx,> 2 pages.
Penrose, P., "Email Payment Challenges Banks," Banking Technology, Mar. 2000, 2 pages.
Stern, Joanna. Show Me the Money: The Best Apps to Pay Friends Back. Wall Street Journal. Published May 14, 2014. Retrieved on Jun. 25, 2014. Retrieved from the Internet: URL<http://online.wsj.com/news/articles/SB10001424052702304536104579558071421978060>. 4 pages.
Money in the Bank, Fast. Venmo.com. Published May 30, 2011. Retrieved on Jun. 25, 2014. Retrieved from the internet: URL<http://blog.venmo.com/hf2t3h4x98p5e13z82p18j66ngcmry/money-in-the-bank-fast>. 2 pages.
New Apps for iPhone & Android. Venmo.com. Published Feb. 16, 2011. Retrieved on Jun. 25, 2014. Retrieved from the internet: URL<http://blog.venmo.com/hf2t3h4x98p5e13z82p18j66ngcmry/brand-new-venmo-apps-for-iphone-and-android>. 4 pages.
International Search Report and Written Opinion in International Patent Application No. PCT/US2014/022825, filed Mar. 10, 2014, received Jun. 24, 2014. 13 pages.
"Beaming Money by Email is Web's Next Killer App," PR Newswire, dated Nov. 16, 1999, Retrieved from the Internet URL: http://search.proquest.com/docview/447901524/1A829944B6E54E3DPQ/86?accountid=14753, on May 27, 2014, pp. 1-6.
"Money can't buy love, but it can certainly show it," PayPal, dated Aug. 27, 2013, Retrieved from the Internet URL: http://web.archive.org/web/20130827230842/https://www.paypal.com/us/webapps/mpp/send-money-online, on May 28, 2014, pp. 1-6.
"Personal Finance," PayPal, dated Aug. 28, 2013, Retrieved from the Internet URL: http://web.archive.org/web/20130828101500/http://www.windowsphone.com/en-us/store/app/paypal/75738196-1db2-49d9-afb1-d66a34d19fb6, on May 13, 2015, pp. 1-3.
Murphy, E., "Google Links Wallet to Gmail, Letting Users Attach Money to Emails," dated May 17, 2013, Retrieved from the Internet URL: http://www.dailyfinance.com/on/google-wallet-gmail-email-money/, on Jun. 25, 2014, pp. 1-5.
O'Reilly Website, "Send Money to Anyone," dated Oct. 26, 2004, Retrieved from the Internet URL: https://web.archive.org/web/20041026014127/http://www.oreilly.com/pub/h/2144, on May 20, 2014, pp. 1-4.
Sapsford, J., "You've Got Mail (With Cash!)—PayPal Sees Torrid Growth With a Service That Sends Money Across the Internet," The Wall Street Journal, dated Feb. 16, 2000, Retrieved from the Internet URL: http://search.proquest.com/docview/398908437/A1E27929D6EB47C2PQ/154?accountid=14753, on May 27, 2014, pp. 1-6.
Warfel, D., "Customizing mailto: Links," The Great Escape Blog, dated Dec. 15, 2012, Retrieved from the internet URL: http://blog.escapecreative.com/customizing-mailto-links/, pp. 1-5.
U.S. Appl. No. 14/246,017, of Grassadonia, B., et al., filed Apr. 4, 2014.
U.S. Appl. No. 14/246,023, of Andersen, R., et al., filed Apr. 4, 2014.
U.S. Appl. No. 14/256,893, of Beckmann, J. et al., filed Apr. 18, 2014.
Non-Final Office Action mailed Jun. 4, 2014, for U.S. Appl. No. 14/246,023, of Andersen, R., et al., filed Apr. 14, 2014.
Non-Final Office Action mailed Jul. 2, 2014, for U.S. Appl. No. 14/246,017, of Grassadonia, B., et al., filed Apr. 4, 2014.
Restriction Requirement mailed Sep. 8, 2014, for U.S. Appl. No. 14/256,893, of Beckmann, J. et al., filed Apr. 18, 2014.
Non-Final Office Action mailed Dec. 1, 2014, for U.S. Appl. No. 14/246,023, of Andersen, R. et al., filed Apr. 4, 2014.
Final Office Action mailed Dec. 8, 2014, for U.S. Appl. No. 14/246,017, of Grassadonia, B., et al., filed Apr. 4, 2014.
Non-Final Office Action mailed Mar. 11, 2015, for U.S. Appl. No. 14/256,893, of Beckmann, J., et al., filed Apr. 18, 2014.
Notice of Allowance mailed Mar. 25, 2015, for U.S. Appl. No. 14/246,017, of Grassadonia, B., et al., filed Apr. 4, 2014.
U.S. Appl. No. 29/488,588, of Rhodes, M., et al., filed Apr. 21, 2014.
U.S. Appl. No. 14/444,741 by Seeman, D., et al., filed Jul. 28, 2014.
Application for Registration of an Industrial Design Examiner's Report in Canadian Patent Application No. 159224, mailed Mar. 6, 2015.
Final Office Action mailed May 21, 2015, for U.S. Appl. No. 14/246,023, of Andersen, R., et al., filed Apr. 4, 2014.
Notice of Allowance mailed Jun. 8, 2015, for U.S. Appl. No. 14/246,023, of Andersen, R., et al., filed Apr. 4, 2014.
Final Office Action mailed Jun. 15, 2015, for U.S. Appl. No. 14/066,991, of Dorsey, J., et al., filed Oct. 30, 2013.
European Patent Office; "EPO Summary of Arguments", Minutes of the Oral Proceedings before the Examining Division; Sep. 22, 2015; Munich, DE.
Restriction Requirement mailed Sep. 10, 2015, for U.S. Appl. No. 14/260,194, of Dorsey, J., et al., filed Apr. 23, 2014.
Supplemental Notice of Allowance mailed Sep. 24, 2015, for U.S. Appl. No. 14/272,367, of Dorsey, J., et al., filed May 7, 2014.
"Square Cash Beams Friends Money via Email," dated Sep. 15, 2013, Retrieved from the Internet URL:http://www.fastcodesign.com/3020143/square-cash-beams-friends-money-via-email, on Oct. 28, 2015, pp. 1-11.
Hamburger, E., "Square Cash lets anyone with a debit card send money instantly over email," The Verge, dated Oct. 15, 2013, Retrieved from the Internet URL: http://www.theverge.com/2013/10/15/4842518/square-cash-send-money-over-email-iphoneandroid, on Oct. 28, 2015, pp. 1-7.
Prabhu, "PayPal unveils PayPal Here Payment Solution for Small Enterprises," 91 mobile, dated Mar. 17, 2012, Retrieved from the Internet URL: http://www.91mobiles.com/blog/paypal-unveils-paypal-here-payment-solution-forsmall-enterprises.html, on Oct. 28, 2015, pp. 1-5.
Robischon, N., "Getting Square: A Guide to the New Mobile Credit Card Payment System for iPhone and Android," Fast Company, dated May 11, 2010, Retrieved from the Internet URL: http://www.fastcompany.com/1643624/getting-square-guide-new-mobile-credit-cardpayment-system-iphone-and-android, on Oct. 28, 2015, pp. 1-7.
Schuppelius, M., "Innovative Payment Companies: iZettle—Mobile Card Processing the Swedish Way," Payment Observer, dated Apr. 11, 2012, Retrieved from the Internet URL: http://www.paymentobserver.com/tag/izettle, on Oct. 28, 2015, pp. 1-8.
Wiener, H., "The Four Hundred—Mad Dog 21__21__Not Weather, nor Whether But When," dated Apr. 9, 2012, IT Jungle, vol. 21, No. 13, pp. 1-5 (Apr. 9, 2012).
Non-Final Office Action mailed Nov. 10, 2015, for U.S. Appl. No. 29/488,588, of Rhodes, M., et al., filed Apr. 21, 2014.
Application for Registration of an Industrial Design Examiner's Report in Canadian Patent Application No. 159224, mailed Aug. 25, 2015.
Decision to Refuse mailed Sep. 22, 2015, in European Patent Application No. 14 155 428.7, of Dorsey, J. et al., filed Feb. 17, 2014.
Notice of Allowance mailed Jul. 15, 2015, for U.S. Appl. No. 14/272,367, of Dorsey, J., et al., filed May 7,2014.
Final Office Action mailed Aug. 4, 2015, for U.S. Appl. No. 14/256,893, of Bekmann, J., et al., filed Apr. 18, 2014.

\* cited by examiner

To: susan@mail.com  ⌒ 502

From: pay@square.com  ⌒ 504

Subject: jon@mail.com has sent you $5!  ⌒ 506 jon@mail.com has sent you $5. Go  ⌒ 508
here to redeem!

500

FIG. 5A http://www.

Account number: ⌒ 512

Expiration date: ⌒ 514

Redeem $5
516

| To: susan@mail.com  ⌇702 |
|---|
| From: invoice@square.com  ⌇704 |
| Subject: jon@mail.com has sent you an invoice for $7!  ⌇706 |
| jon@mail.com has sent you a $7  ⌇708<br>invoice for Dinner on Friday.  Go <u>here</u><br>to pay! |

700

TRANSFERRING MONEY USING EMAIL

CROSS-REFERENCE TO RELATED APPLICATIONS

This application is a continuation-in-part application of, and claims priority to, pending U.S. patent application Ser. No. 14/066,991, filed on Oct. 30, 2013, entitled "Transferring Money Using Email," which is a continuation application of, and claims priority to, U.S. patent application Ser. No. 13/839,623, filed on Mar. 15, 2013, entitled "Method for Transferring Money Using Email." The disclosure of the foregoing applications is incorporated herein by reference in its entirety.

TECHNICAL FIELD

This disclosure relates to payment processing using email.

BACKGROUND

A sender can transfer money to a recipient over the Internet. For example, the sender and recipient can use online banking services. To transfer money, the sender can provide bank information, e.g., account number and routing number, of the recipient to the sender's bank. The bank can process the transfer, e.g., through a wire transfer or the automated clearing house (ACH) financial network. Alternatively, the sender can use a third party money transfer service to transfer money. The third party transfer service can act as a middleman to the transfer. The sender transfers money to the third party transfer service, and the third party transfer service forwards the money to the recipient. To transfer money, the sender uses software, e.g., a web site or mobile application, developed by the third party money transfer service.

SUMMARY

Generally, a sender transfers money to a recipient using a physical check, online banking services, or third party transfer services, which can be cumbersome. Checks need to be physically deposited at a bank. Some online banking services require the recipient's bank account number and routing number before transferring the money. A third party transfer service requires both the sender and the receiver to have an account at the service and also requires the sender to use customized software developed by the third party, e.g., a web site or mobile application, to transfer money. For example, to transfer money to the recipient, the sender uses a browser to access a web site of the third party transfer service. The web site provides an interface to send money to a recipient, who also has an account with the third party transfer service.

As will be described in this specification, a system can transfer money from a sender to a recipient using standard email protocol. The sender can send an email message to the recipient and a service email address operated by the system, e.g., the service email address is carbon copied (CC'ed) on the email message. The system identifies respective card accounts for the sender and recipient and a payment amount from the email message. The system submits a request to transfer the payment amount from the sender's card account to the recipient's card account.

In general, one innovative aspect of the subject matter described in this specification can be embodied in methods that include the actions of receiving, at a user device, user input of a requested payment amount to be transferred from a recipient account of a payment service system to a sender account of the payment service system; generating, by the user device, a draft email message having the requested payment amount in a subject or body of the draft email message and having a confirmation link to a network resource associated with a payment service system; receiving, at the device, user input of a recipient email address of the recipient; and sending, by the user device, the email message to an email server, wherein the email server forwards the email message to a recipient user device according to the recipient email address, wherein upon receiving an indication that the recipient selected the confirmation link in the email message, the payment service system identifies the sender account of the sender and a recipient account of the recipient and initiates a transfer of the requested payment amount from the recipient account to the sender account. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In general, another innovative aspect of the subject matter described in this specification can be embodied in methods that include the actions of receiving, at a user device, user input of a request to transfer a payment amount from a recipient account with a payment service system to a sender account of a sender with the payment service system; and generating a draft email message having content identifying the requested payment amount, the draft email message including a confirmation link to a network resource associated with the payment service system, wherein upon receiving an indication that the recipient selected the confirmation link, the payment service system identifies a sender account of the sender and a recipient account of the recipient and initiates a transfer of the requested payment amount from the recipient account to the sender account. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include sending, by the user device to the payment service system, an indication of the request to transfer the payment amount from the recipient account, wherein the indication includes an identifier of a sender account of the sender with the payment service system. Sending the indication comprises addressing the draft email message to a service email address associated with the payment service system. Sending the indication comprises sending a network request to a server of the payment service system. The actions include requesting, by the user device from the payment service system, an identifier for the request; and receiving, from the payment service system by the user device, an identifier for the request, wherein the draft email message includes the identifier for the request. The actions include sending, by the user to device to the payment service system, a request to verify a sender account of a sender associated with a user application installed on the user device; determining that the sender does not have an account with the payment service system; in response to determining that the sender does not have an account with the payment service system, prompting, by the user device, the sender to enter payment information; and sending the payment information to the payment service system, wherein the payment service system initiates the transfer of the requested payment amount using the payment information provided by the sender. The payment service system initiates the transfer without asking the sender to enter a username or a password. The draft email message includes the payment amount in a subject or body of the draft email message. The draft email message includes embedded content that identifies the payment amount.

In general, another innovative aspect of the subject matter described in this specification can be embodied in methods that include the actions of receiving, from a user device at a payment service system, an indication of an email message being sent from the user device to an email server, the email message requesting an amount to be transferred from a recipient account of the payment service system of a recipient of the email message to a sender account of the payment service system of a sender of the email message, wherein the indication includes a requested payment amount to be transferred and an identification of a recipient email address of the recipient; generating an email message addressed to a recipient email address of the recipient, the email message having the requested payment amount in a subject or body of the email message and having a conformation link that, when selected by the recipient, authorizes transfer of the requested payment amount from the recipient account to the sender account; sending the email message to an email server to be forwarded by the email server to the recipient at the recipient email address; receiving an indication that the recipient selected the confirmation link; and in response to receiving the indication that the recipient selected the confirmation link, initiating a transfer of the requested payment amount from the recipient account to the sender account. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of receiving, from a user device at a payment service system, an indication of an email message being sent from the user device to an email server, the email message requesting an amount to be transferred from a recipient account of the payment service system of a recipient of the email message to a sender account of the payment service system of a sender of the email message, wherein the indication includes a requested payment amount to be transferred and an identification of a recipient email address of the recipient; generating an email message addressed to a recipient email address of the recipient, the email message having content identifying the requested payment amount, the email message including a confirmation link to a network resource associated with the payment service system; sending the email message to an email server to be forwarded by the email server to the recipient at the recipient email address; receiving an indication that the recipient selected the confirmation link; and in response to receiving the indication that the recipient selected the confirmation link, initiating a transfer of the requested payment amount from the recipient account to the sender account. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The indication includes a sender email address of the sender. The email message includes the payment amount in a subject or body of the email message. The email message includes embedded content that identifies the payment amount.

In general, another innovative aspect of the subject matter described in this specification can be embodied in methods that include the actions of receiving, at a user device, user input of a payment amount to be transferred from a sender account of a sender of a payment service system to a recipient account of a recipient of the payment service system; generating a draft email message having the payment amount in a subject or body of the email message; receiving, at the user device from the sender, user input of a recipient email address of the recipient into a draft email message; receiving, at the user device, an indication that the sender sent the email message to the recipient; and in response to receiving an indication that the sender sent the email message to the recipient, sending, by the user device to the payment service system, the payment amount, an email address associated with a sender account, and the recipient email address, wherein upon receiving the payment amount and the recipient email address, the payment service system identifies a recipient account of the recipient associated with the recipient email address and initiates a transfer of the requested payment amount from the sender account to the recipient account. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of receiving, at a user device, user input a request to send a payment amount from a sender account of the sender with a payment service system to a recipient account of the payment service system; receiving, from the sender, user input of a recipient email address of the recipient into a draft email message; receiving an indication that the sender sent the email message to the recipient; and in response to receiving an indication that the sender sent the email message to the recipient, sending, by the user device to the payment service system, the payment amount and the recipient email address, wherein upon receiving the payment amount and the recipient email address, the payment service system identifies a recipient account of the recipient and initiates a transfer of the requested payment amount from the sender account to the recipient account. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include sending, by the user device to an email server, an email message having content identifying the requested payment amount, the email message being addressed to the recipient email address. The actions include generating a draft email message having content identifying the requested payment amount; and receiving user input of a command to send the email message to the email server. The email message includes embedded content that specifies the payment amount. The payment service system initiates the transfer without further user input from the sender. The payment service system initiates the transfer without user input from the recipient.

In general, another innovative aspect of the subject matter described in this specification can be embodied in methods that include the actions of receiving, at a payment service system from a user device, a first email message requesting an amount to be transferred between a sender account of the payment service system and a recipient account of the payment service system, the sender account being associated with the sender of the first email message, the recipient account being associated with the recipient of the first email message, wherein the first email message includes a requested payment amount in a subject or body of the email message; determining that the requested payment amount in the first email message is an invalid payment amount; in response to determining that the requested payment amount in the first email message is an invalid payment amount, sending a second email message to a sender email address of the sender, the second email message inviting the sender to correct the requested payment amount; receiving, at the payment service system from the user device, a corrected email message that includes a corrected payment amount; identifying the sender account associated with the sender email address and a recipient account associated with the recipient email address; and initiating a transfer of the corrected payment amount. Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of receiving, at a payment service system, a first email message requesting an amount to be transferred between a sender account of the payment service system of a sender of the first email message and a recipient account of the payment service system of a recipient of the first email message, wherein the first email message includes a requested payment amount to be transferred and an identification of a recipient email address of the recipient; determining that the first email message includes an error; in response to determining that the first email message includes an error, sending a second email message to a sender email address of the sender, the second email message including information that identifies the error; receiving, from a user device, a corrected email message that includes corrected information; and initiating a transfer of the requested amount according to the corrected information, including identifying a sender account of the sender, identifying a recipient account of the recipient, and transferring the requested payment amount between the sender account of the sender and the recipient account of the recipient. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include sending a second corrected email message to the recipient email address, the second corrected email message having the corrected information. Determining that the first email message includes an error comprises determining that the recipient does not have an account with the payment service system. Determining that the first email message includes an error comprises determining that the requested amount is not a valid amount. Determining that the first email message includes an error comprises determining that the requested amount is not within a valid range. Determining that the first email message includes an error comprises determining that the requested amount has a syntax error. Determining that the first email message includes an error comprises determining that the first email message includes inconsistent data.

Advantages may include one or more of the following. A system can transfer money from a sender to a recipient in response to an email message. The system is intuitive because the sender can transfer money using an interface that users are already familiar with, i.e., a process of sending emails. The system's infrastructure utilizes already existing email server infrastructure, thereby minimizing cost to implement the system. If the recipient does not have a card account associated with the system, the system provides an interface for the recipient to enter financial account information, e.g., a card account number and an expiration date. After the recipient enters in the financial account information, the system allows the recipient to redeem a payment amount from the sender and, at the same time, also creates an account on the system for the recipient, thereby facilitating future money transfers for the recipient. The system also allows a sender to invoice a recipient for a payment amount.

BRIEF DESCRIPTION OF THE DRAWINGS

FIG. 5A-B are illustrations of example user interfaces for transferring money between the sender and the recipient, where the recipient does not have a card account associated with the payment service system.

Like reference numbers and designations in the various drawings indicate like elements.

DETAILED DESCRIPTION

Figure 1:
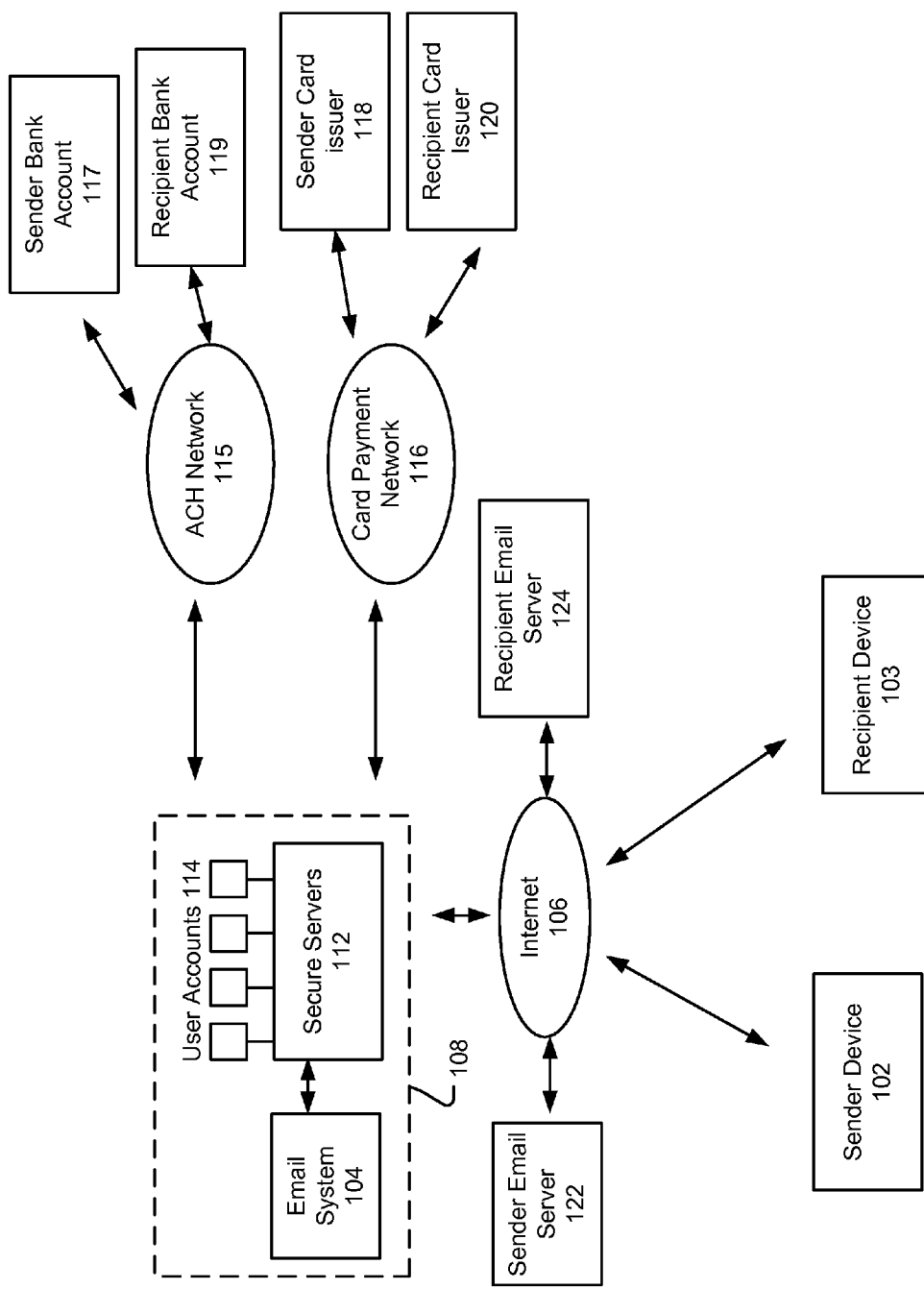
FIG. 1 is a schematic illustration of an example system architecture for transferring money over email.

FIG. 1 is a schematic illustration of an example system architecture 100 for transferring money over email. In particular, the system 100 can use email to have money transferred over bank account or debit card networks, which will be described further below. The overall system 100 includes a sender device 102, e.g., a desktop computer, connected to a network, e.g., the Internet 106. The sender device 102 is a computing device capable of running an email application. For example, the sender device 102 can be a smartphone, a tablet, a desktop computer, a laptop computer, or other data processing apparatus. The recipient device 103 is also a computing device connected to the Internet 106. The recipient device 103 can be a mobile device, e.g., a smartphone, tablet, or other portable data processing apparatus. A sender can use the sender device 102 to send, through a sender email server 122, an email to a recipient account to transfer money over email. The recipient account can receive the email through the recipient email server 124, which provides the email for display on the recipient device 103, e.g., using standard email protocols. Transferring money over email will be described further below in reference to FIGS. 2-7.

A payment processor operates a payment service system 108. The payment processor processes transfers conducted between the sender and recipient devices 102, 103. The sender device 102 can send an email to the recipient device 103 and to the payment service system 108, e.g., the payment service system 108 is carbon copied (CC'ed) on the email. The payment service system can, based on the email, transfer money between a sender card account to a recipient card account, and can communicate with the sender and recipient devices 102, 103 using an email system 104.

The email servers 122, 124, and the email system 104 can be part of any appropriate email service that includes one or more email servers that accept, forward, deliver, or store email messages, e.g., mail servers operating under Simple Mail Transfer Protocol (SMTP). The email servers can implement web-based, POP3, or IMAP email services to name just a few examples.

The payment service system 108 includes one or more servers 112, at least some of which can handle secure transactions (e.g., using a secure server), to process all emails with the sender and recipient devices 102,103. In general, servers 112 can store public merchant information such as the merchant's address or phone number. The servers 112 also handle secure information such as credit card numbers, bank accounts, user accounts 114, e.g., user identifying or profile information, debit card numbers, or other sensitive information.

Each user account 114 can be associated with one or more card accounts, e.g., debit or credit card accounts, of the user. A card account can be a financial account managed by a card issuer 118 and can be associated with a card number. In some implementations, the one or more card accounts are stored at the secure server 112. Generally, the card issuer 118 issues a physical payment card for each card account.

The payment service system 108 can communicate with a computer system 116 of a debit card payment network, e.g., STAR or PULSE. In some implementations, the payment service system can communicate with a computer system of a credit card payment network, e.g., Visa or MasterCard. The payment service system 108 can communicate with a computer system 116 over the same network 106 used to communicate with the sender device 102, or over a different network. The computer system 116 of the card payment network can communicate in turn with a computer system 118 of a sender card issuer, e.g., a bank, and a computer system 118 of a recipient card issuer. The sender card issuer 118 and the recipient card issuer 120 can transfer money, e.g., over a debit payment network, in response to a request to transfer money from the payment service system 108.

In some implementations, the payment service system 108 can communicate with a computer system 115 of the Automated Clearing House (ACH) network. The computer system 115 of the ACH network can communicate with a sender bank account 117 and a recipient bank account 119. The sender bank account 117 and the recipient bank account 119 can transfer money, e.g., using the ACH network, in response to a request to transfer money from the payment service system 108. There can also be computer systems of other entities, e.g., the card acquirer, between the payment service system 108 and the card issuers and between the payment service system 108 and the bank accounts.

Eventually, in order to receive funds from the transfer, the recipient will need to enter financial account information into the payment service system 108 sufficient to receive funds. For example, in the case of a bank account, the recipient can provide the bank account number and routing number. The recipient's financial account can also be associated with a debit card account, or another third party financial account. In addition, in some implementations, if the recipient has not entered the financial account information, the payment processor can hold the received funds until the financial account information is provided.

To transfer money between the sender and the recipient, the payment service system 108 can operate as a gateway or a middleman.

To operate as a gateway, the payment service system 108 can identify debit card accounts, e.g., stored at the secure servers 112, for both the sender and the receiver. The payment service system 108 can submit a request to an appropriate card issuer, e.g., to the sender's card issuer or to the receiver's card issuer, to transfer money. For example, the request can be sent over debit rails. That is, a debit card network can receive the request and can carry out the request to transfer money. The appropriate card issuer can receive and process the request by transferring money to the appropriate card account.

To operate as a middle man, the payment service system 108 can receive a payment amount by processing a card, e.g., a credit card or a debit card, of the sender and hold the payment amount. The payment service system 108 can push the payment amount, e.g., over debit rails, to a debit account of the recipient. Instead of holding the payment amount, the payment service system 108 can also forward the payment once the recipient links an account with the payment service system 108. Alternatively, the payment service system 108 can generate a transaction using ACH that debits an amount from the sender bank account and can credit the amount into a recipient bank account, e.g., using ACH, or onto a debit account, e.g., over debit rails, of the recipient.

Figure 2:
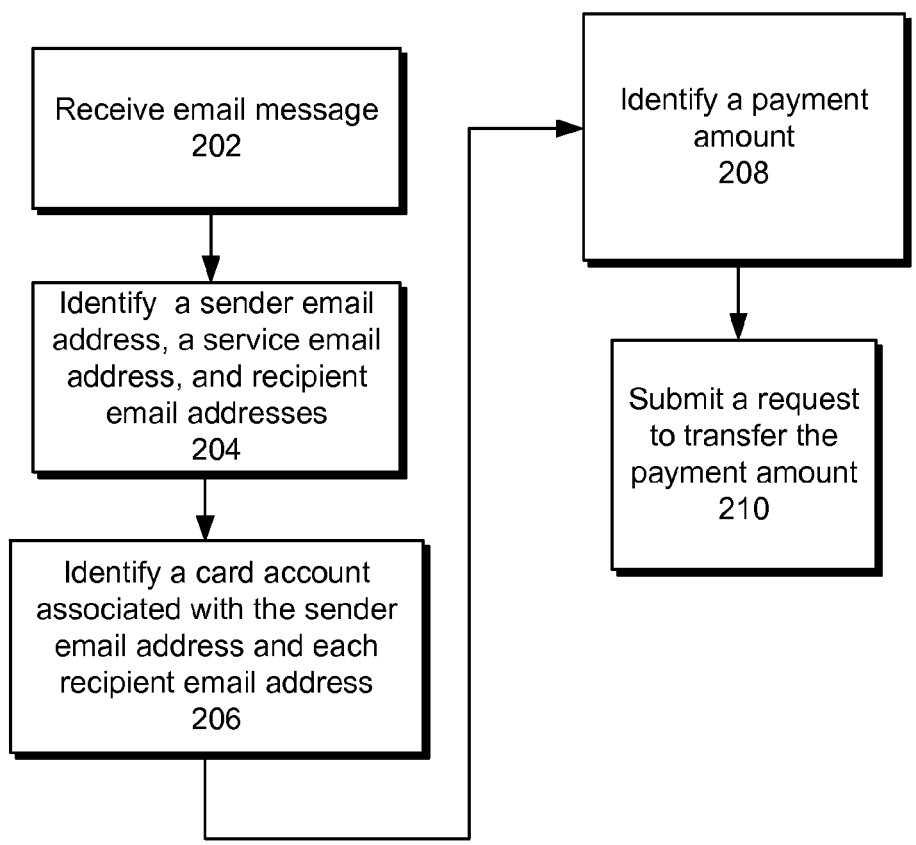
FIG. 2 is a flow chart of an example process of transferring money over email from a sender and a recipient where both have card accounts associated with a payment service system.

FIG. 2 is a flow chart of an example process of transferring money over email from a sender and one or more recipients, where the sender and each recipient have card accounts associated with a payment service system. For convenience, the process will be described with respect to a system, e.g., the payment service system 108 as described above in reference to FIG. 1.

The system receives an email message from a sender device (step 202). The email message can be forwarded from an email server of the system. The email message can have a syntax that includes, e.g., in the email message's headers, a sender email address, a service email address, a payment amount, and one or more recipient email addresses. The email message can also include an optional description. An example email message is discussed further below in reference to FIG. 3A.

The system can operate one or more service email addresses, e.g., pay@square.com or invoice@square.com. The system receives messages emailed to each of the one or more service email addresses and processes the messages based on the email address. For example, messages sent to pay@square.com can cause the system to transfer money from the sender email address to the recipient email address. On the other hand, messages sent to invoice@square.com can cause the system to send an invoice from the sender email address to the recipient email address. These will both be described in further detail below.

The system can authenticate received emails for integrity. For example, the system can use domain keys to verify message integrity and a domain of an email sender. The system can also prevent email spoofing and verify sender Internet Protocol (IP) addresses using sender policy framework (SPF). The system identifies the sender email address, a service email address, and each recipient email address from the email message (step 204). The system can parse a From field of the email message to identify the sender email address. The system can parse a To or CC field of the email message to identify each recipient email address. The system can also parse the To or CC field of the email message to identify the service email address. To identify the service email address, the system can compare each email address in the email message to a list of service email addresses stored at the system.

The system identifies, for the sender email address, a sender card account associated with the payment service system and, for each of the one or more recipient email addresses, a respective recipient card account associated with the payment service system (step 206). The card accounts can be identified from a secure database, e.g., the secure server 112, which associates email addresses to card accounts. Each card account can be associated with a physical debit card and with a user account. Although this describes using card accounts, the system can also use any financial account, e.g., bank accounts, wire transfers, or other funding mechanisms.

The system identifies a payment amount from the email message (step 208). The payment amount can be in the subject or body of the email message. In some implementations, the system identifies text in the email that includes a currency type, e.g., a '$', and designates the text as the payment amount.

Figures 3A, 3B:
FIGS. 3A-B are illustrations of an example user interfaces for transferring money over email between the sender and the recipient where both have card accounts associated with the payment service system.

In some implementations, the system ignores email messages that do not follow the syntax described in reference to FIG. 2 and FIG. 3A. For example, the system can discard email messages that have more than one service email address in the message, do not have the payment amount in the email message, or have more than one payment amount in the email message. The system can also discard if there is not a valid payment amount, e.g., a number, following a currency symbol, e.g., the payment amount is "$X" in the email. In these cases, the system can notify the sender and/or recipient email address that the system did not transfer money to the recipient email addresses.

In some implementations, the system identifies a description in the email message. For example, the email message can include a description, e.g., "Lunch on Tuesday," of the reason for a sender transferring the money. The description can be included in the body of the email message. The system can store the description of the transfer in the secure database.

The system optionally sends a confirmation email to the sender before submitting a request to transfer the payment amount. That is, the sender must engage a link in the confirmation email, e.g., the sender replies to the email with a "YES," to confirm the payment. Upon receiving an indication the sender engaged with the link, the system can submit a request to transfer the payment amount. In some other implementations, the system sends a confirmation email to the sender and also submits the request to transfer the payment amount. The sender can receive the confirmation email and can engage with the email, e.g., click on a link or reply to the email, to report an unauthorized payment.

The system submits a request, e.g., to an appropriate card issuer, to transfer the payment amount from an account of the sender email address to an account of each recipient email address (step 210). In some implementations, the system splits the payment amount among recipient card accounts. For example, the system can divide the payment amount into equal portions among the recipient email addresses and can submit a request to transfer, for each recipient email address, the respective portion to the respective card account of the respective recipient email address. In some other implementations, the system transfers the same payment amount to each recipient card account.

The system can receive a confirmation of the transfer from the card issuer. After receiving the confirmation, e.g., from a card issuer, that the payment amount(s) is transferred, the system can send a confirmation email to the sender email address and to each recipient email address indicating a successful transfer. The confirmation email can include the last 4 digits of the appropriate card number. In some implementations, the system sends the confirmation email by replying to the original email message, thereby allowing the original email message and the confirmation email to be displayed in an email client of the recipient.

In some implementations, if the card issuer rejects the transfer, the system can repeat the above mentioned steps 202-210 and request ACH information instead of card information from the recipient.

Under some circumstances, the email message is sent to the system more than once. For example, the sender's device can be a mobile device that has intermittent Internet connection. The system can generate a hash of a first email message based on headers of the email message. For example, the hash can be based on a message identifier, the recipient field, the sender field, a date, a time, and/or a subject line. If the system receives a second email message, the system generates a hash of the second email message based on headers of the second email message. The system can compare the hashes together, and if they are equal, the system can discard the second email.

FIG. 3A is an illustration of an example user interface 300 for transferring money from a sender to a recipient who both have card accounts associated with a payment service system. The sender can, e.g., using a device, use an email application or a web browser connected to an email server to compose an email. The email can include a recipient email address 302, a service email address 306, a sender email address 304, a subject 308, and a body 310. The sender can include a payment amount to be transferred in the subject 308, e.g., "$5," and a description of the money transfer, "e.g., Lunch on Tuesday," in the body 310 of the email. By sending an email in this format, the sender is requesting, using a payment service system that operates pay@square.com, a transfer of $5 from the sender's card account to a card account of susan@mail.com.

FIG. 3B is an illustration of an example user interface 312 for a transfer confirmation email received by the recipient email address. By way of illustration, after processing the email that is reference in FIG. 3A, the payment service system can send a confirmation email of the transfer to the recipient email address 302. The confirmation email can include a subject 314 that indicates how much a sender has transferred and a description 316 of the transfer.

Figure 4:
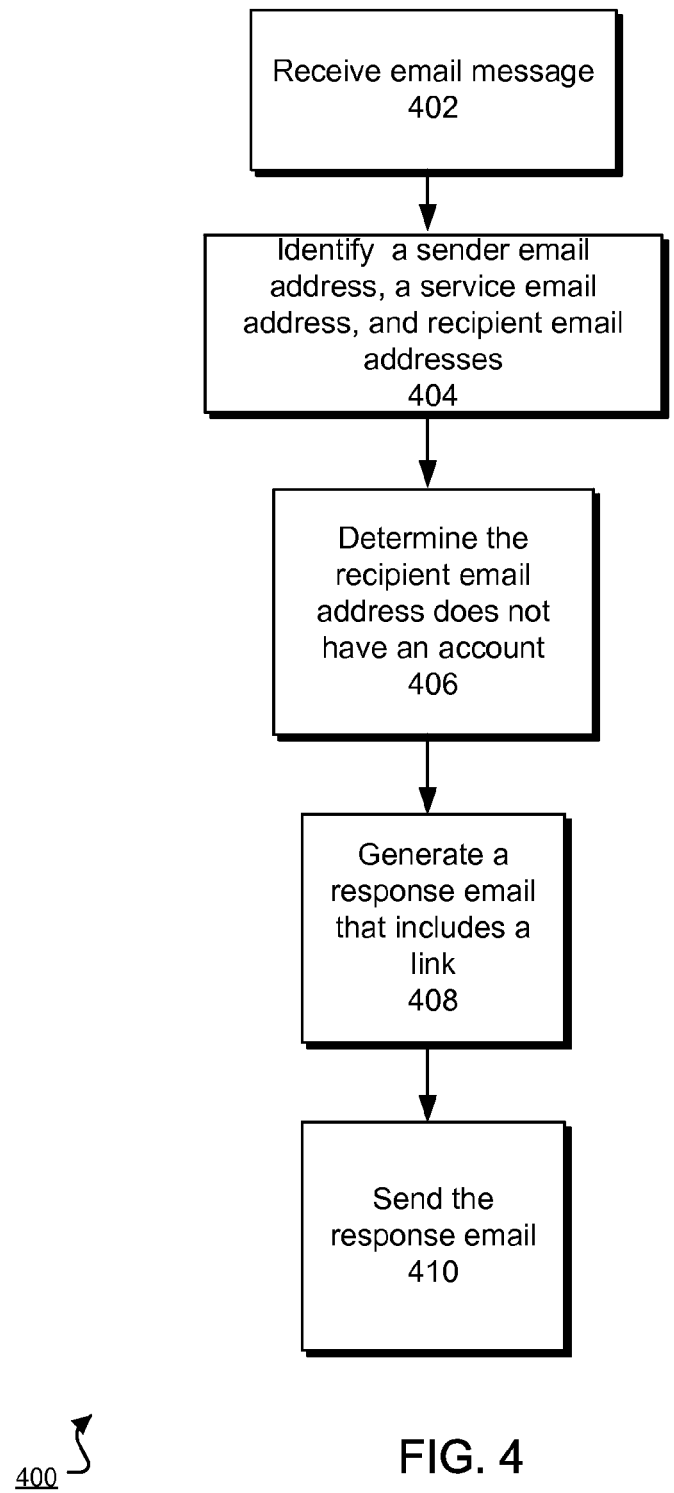
FIG. 4 is a flow chart of an example process of transferring money from a sender that has a card account associated with the payment service system and a recipient that does not have a card account associated with the payment service system.

FIG. 4 is a flow chart of an example process of transferring money from a sender that has a card account associated with the payment service system and one or more recipients that do not have a card account associated with the payment service system. For convenience, the process will be described with respect to system, e.g., the payment service system 108 as described above in reference to FIG. 1.

The system can operate as described above in reference to steps 202, 204, and 208 as described above in reference to FIG. 2. That is, the system receives an email message from a sender device (step 402). The system identifies a sender email address, a service email address, and recipient email addresses from the email message (step 404).

The system determines at least one of the recipient addresses do not have a card account associated with the system (step 406). In some implementations, the system determines whether the recipient email addresses exist in the user accounts database.

The system generates a response email to be sent to the recipient email addresses that do not have a card account with the system (step 408). The response email can be generated based on the service email address. For example, if the service email address is pay@square.com, the system can generate a payment redemption response email. Alternatively, if the service email address is invoice@square.com, the system can generate an invoice email. Examples of both response emails are discussed further below in reference to FIG. 5A.

If the system receives data indicating the recipient engaged with the response email, e.g., the recipient follows a link in the response email, the recipient can simultaneously redeem or invoice the payment amount and create an account with the system, which facilitates future money transfers and invoices to the recipient. The response email can include a link to a resource that requests at least a card account number and an expiration date. The resource can be customized to the recipient email address. This is discussed further below in reference to FIG. 5A.

The system sends the response email to each recipient email address that does not have a card account associated with the system (step 410).

In response to receiving data that a recipient provided financial information through the response email, the system can create a user account at the system for the recipient. The user account can be associated with the recipient email address, the recipient's card account, and the expiration date. In future money transfers to the recipient, the system no longer generates a response email due to the creation of the user account. Instead, in response to receiving an email message with an appropriate syntax, the system submits a request to transfer money as discussed above in reference to FIG. 2. After a user account is created, the recipient can also transfer money or send invoices to other recipients.

If the response email is a payment redemption email, the system can receive, through the resource, an indication to redeem the payment amount. That is, the recipient can follow a link, using a recipient device, in the resource to redeem the payment amount. The link, which is customized to the recipient, can be encoded with the sender email address and the recipient email address, or can be encoded with an identifier that refers to the sender and recipient email addresses. In some implementations, the link is displayed as a button display object. Based on the link, the system can identify the respective card account for the sender and the recipient. In response to the recipient engaging with the link, e.g., the recipient taps on the link, the system can submit a request to transfer the payment amount from the sender card account to the recipient card account.

Alternatively, if the response email is an invoice email, the system can receive, through the resource, an indication to pay the payment amount. That is, the recipient can follow a link in the resource to pay the payment amount. Similar to the customized link described above, the system can identify the respective card account for each email address. The system can submit a request to transfer the payment amount from the recipient card account address to the sender card account.

FIG. 5A is an illustration of a user interface 500 of a payment redemption email message sent from a payment service system. The email message can be sent from a service email address 504 to a recipient email address 502. The subject 506 can include a description of a sender and a sent payment amount. The description 508 of the email can include a link to a resource, e.g., a customized link described above in reference to FIG. 4, for the recipient to redeem the payment amount.

FIG. 5B is an illustration of an example user interface 510 of a resource linked from the payment redemption email in reference to FIG. 5A. The resource can include text fields for a card account number 512, e.g., a debit card number, and an expiration date 514 of the card. The resource can display a button 516 that links to the payment service system. The button can be encoded with an identifier of the recipient and the sender. In response to the recipient engaging the button 516, the payment service system can create an account for the recipient and transfer the payment amount, as described above in reference to FIG. 4.

In some implementations, the resource can request, e.g., display text fields for, additional information from the user. For example, the resource can request a recipient's name, phone number, social security number, or birthday. In some implementations, the payment service system determines the recipient's name from email headers.

Similar to generating the payment redemption email, the payment service system can generate an invoice email. For example, a generated invoice email can have the subject 506 read "jon@mail.com has sent you an invoice for $5." The service email address 504 can be invoice@square.com. The description 508 can read "jon@mail.com has sent you an invoice for $5. Go here to pay!" The customized resource, likewise, can display a button 516 that reads "Pay $5." Upon receiving an indication that a recipient engages with the button 516, the payment service system can create an account for the recipient and invoice the payment amount, as described above in reference to FIG. 4.

Figure 6:
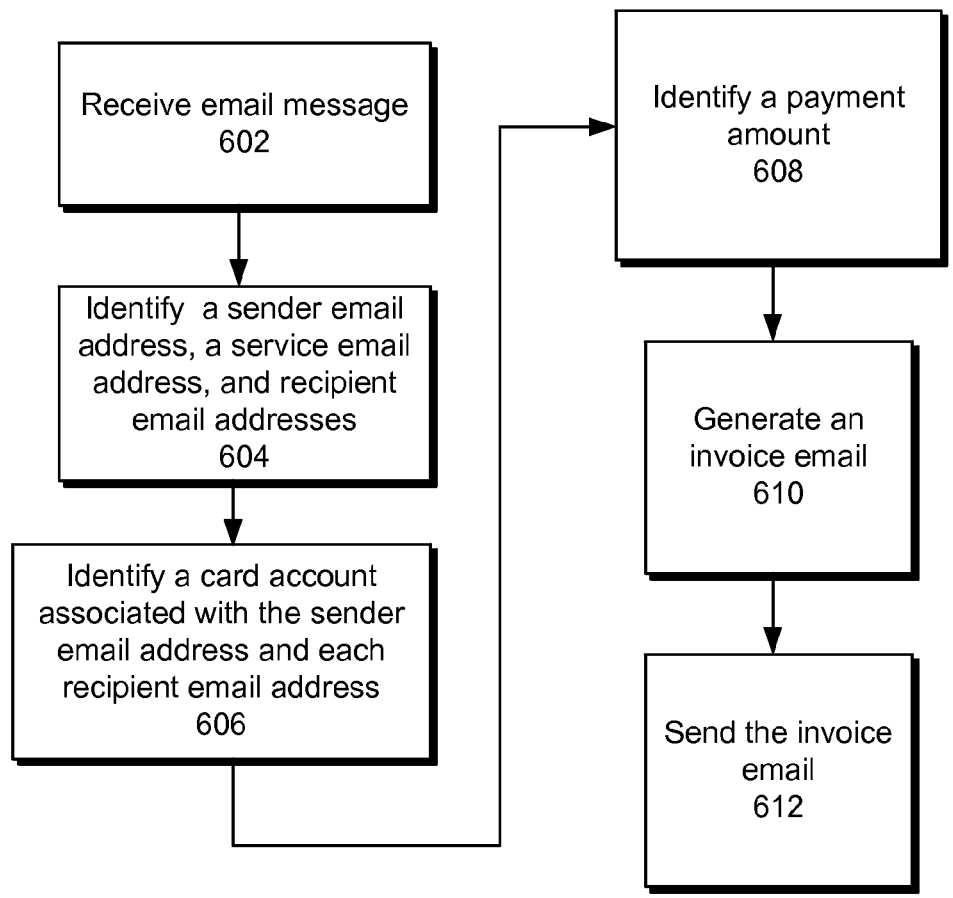
FIG. 6 is a flow chart of an example process of a sender invoicing a recipient for a payment amount.

FIG. 6 is a flow chart of an example process of a sender invoicing a recipient for a payment amount. For convenience, the process will be described with respect to a system, e.g., the payment service system as described above in reference to FIG. 1.

The system can operate as described above in reference to steps 202, 204, 206, and 208 as described above in reference to FIG. 2. That is, the system receives an email message from a sender device (step 602). The system identifies a sender email address, a service email address, and recipient email addresses from the email message (step 604). The system identifies a card account associated with the sender email address and each recipient email address (step 606). As noted above, even though this describes using card accounts, the system can also use any financial account, e.g., bank accounts, wire transfers, or other funding mechanisms. The system identifies a payment amount from the email message (step 608).

Because the sender and each recipient have respective card accounts associated with the system, the system can generate an invoice email that includes a link to pay the payment amount from a respective account of each recipient (step 610). The invoice email is described further below in reference to FIG. 7.

The system can send each invoice email to the respective recipient email addresses (step 612).

Figure 7:
FIG. 7 is an illustration of an example user interface for invoicing the recipient over email.

FIG. 7 is an illustration of an example user interface for invoicing the recipient over email. The email can be addressed to a recipient email address 702 and sent from a service email address 704. The subject 706 can include a sender email address and an invoice amount. The description 708 can include a description of the invoice sent by the sender email address. Upon engaging with the link, the recipient can use the recipient device to send an indication to pay the invoice amount. The payment service system can receive data indicating the recipient engaged with the link. The payment service system can then submit a request to transfer the invoice amount from the account of the recipient to the account of the sender.

Figure 8:
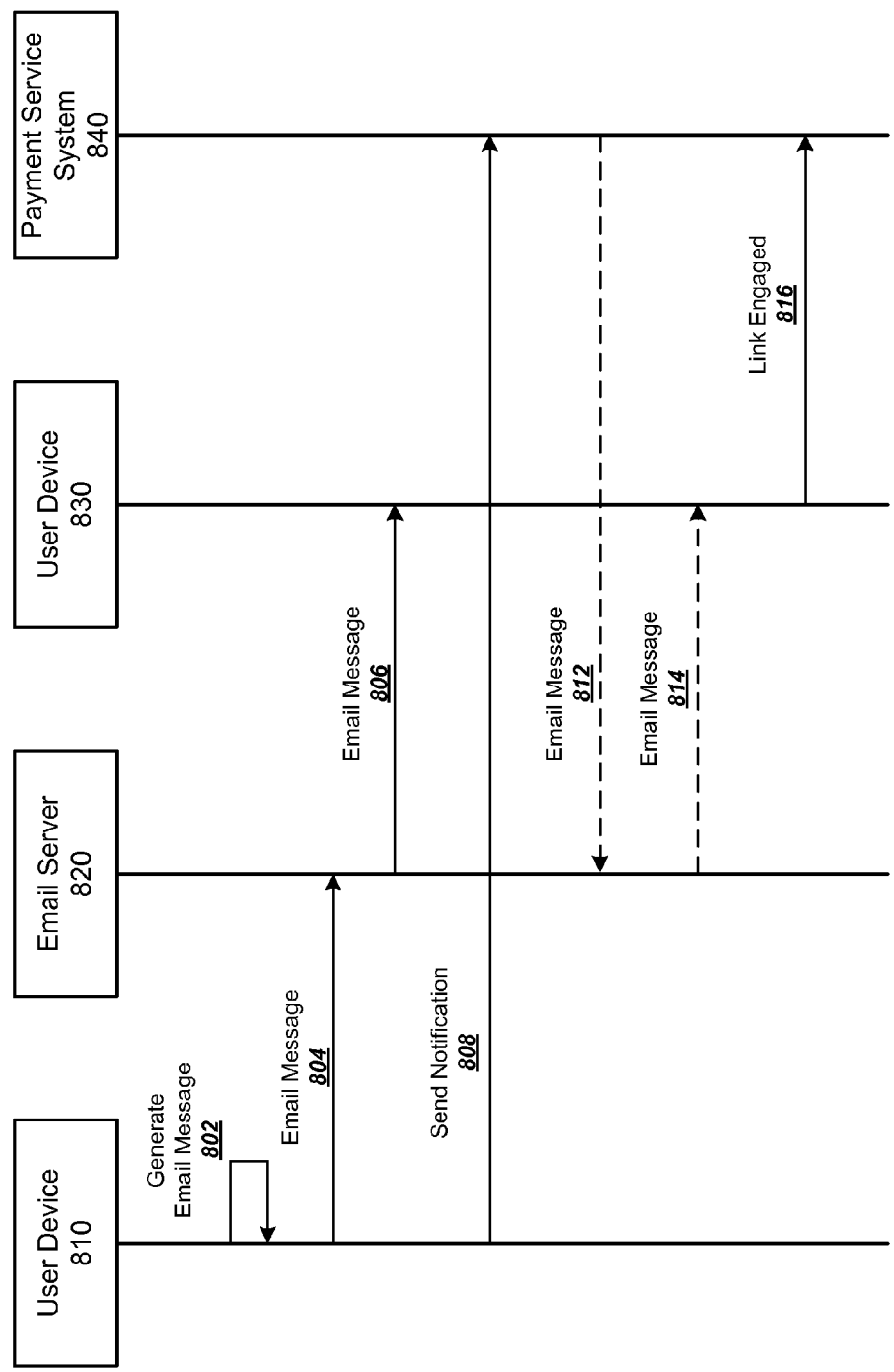
FIG. 8 is a sequence diagram of an example process for requesting money using email.

FIG. 8 is a sequence diagram of an example process for requesting money using email. In general, a user application installed on a user device 810 generates an email message 806 in response to user input of a requested payment amount. When a recipient of the email message engages a confirmation link in the email message, a payment service system 840 can transfer the requested payment amount between an account of the recipient and an account of the sender.

The user device 810 generates an email message (802). The email message includes a confirmation link to a payment service system that, when activated, causes the payment service system to initiate a transfer of a requested payment amount between the sender and the recipient of the email message. A user application installed on the user device can generate the email message in response to user input.

Figure 9:
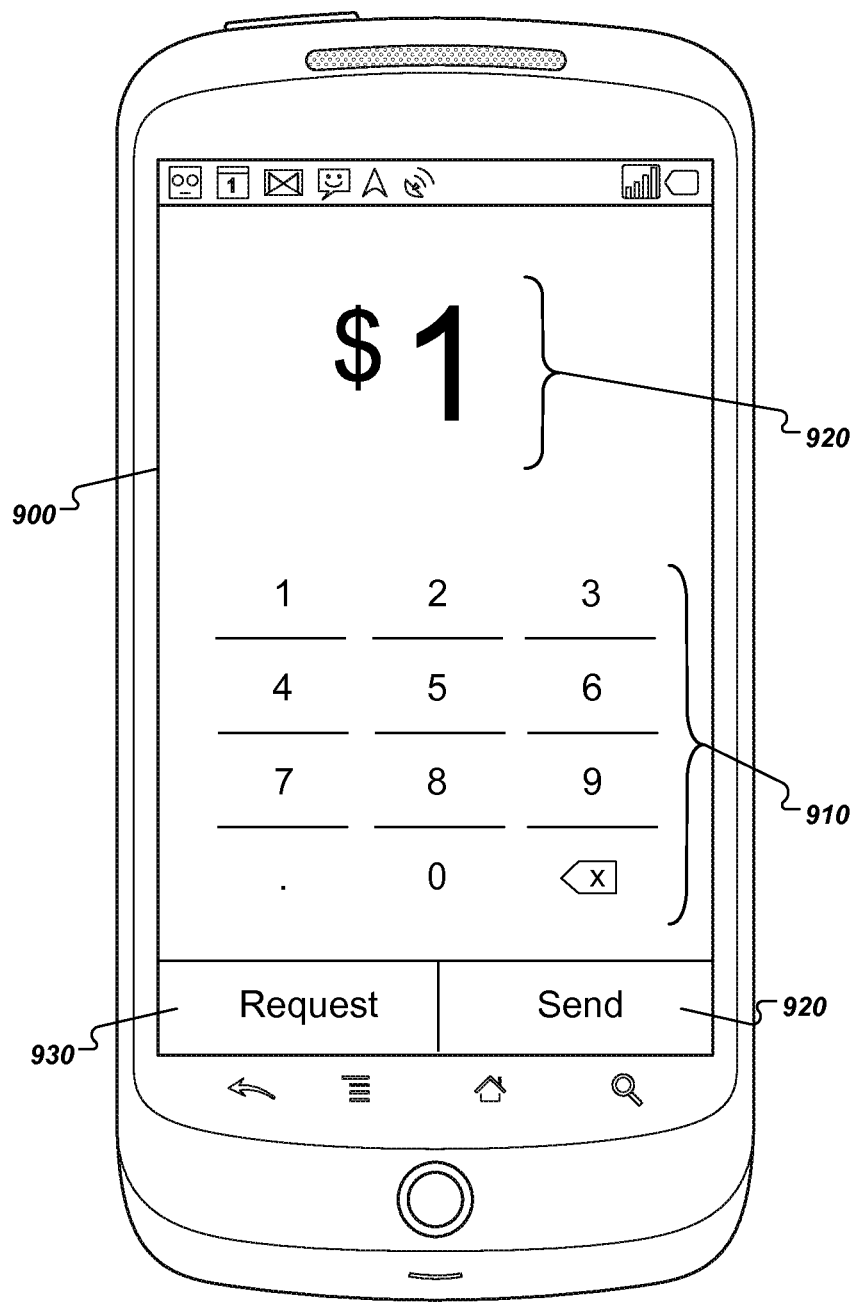
FIG. 9 illustrates an example user interface for generating an email message.

FIG. 9 illustrates an example user interface 900 for generating an email message. The user interface 900 can be generated by a user application installed on a user device. The interface 900 includes a keypad 910, a requested amount 920, a request button 930, and a send button 920.

To send money to a recipient, a user can enter a payment amount 920 using the keypad 910. Upon user selection of the send button 920, the user application can generate an email message that that includes a particular service email address of a payment service system that will cause the payment service system to initiate payment between the sender and the recipient, for example, as shown in FIG. 3A and FIG. 3B.

To request money from a recipient, a user can enter a requested payment amount 920 using the keypad 910. Upon user selection of the request button 930, the user application can generate an email message having a confirmation link for initiating a transfer of a requested payment amount, for example, as shown in FIG. 7. The email message generated by the user application need not include a service email address of a payment service system.

Figure 10:
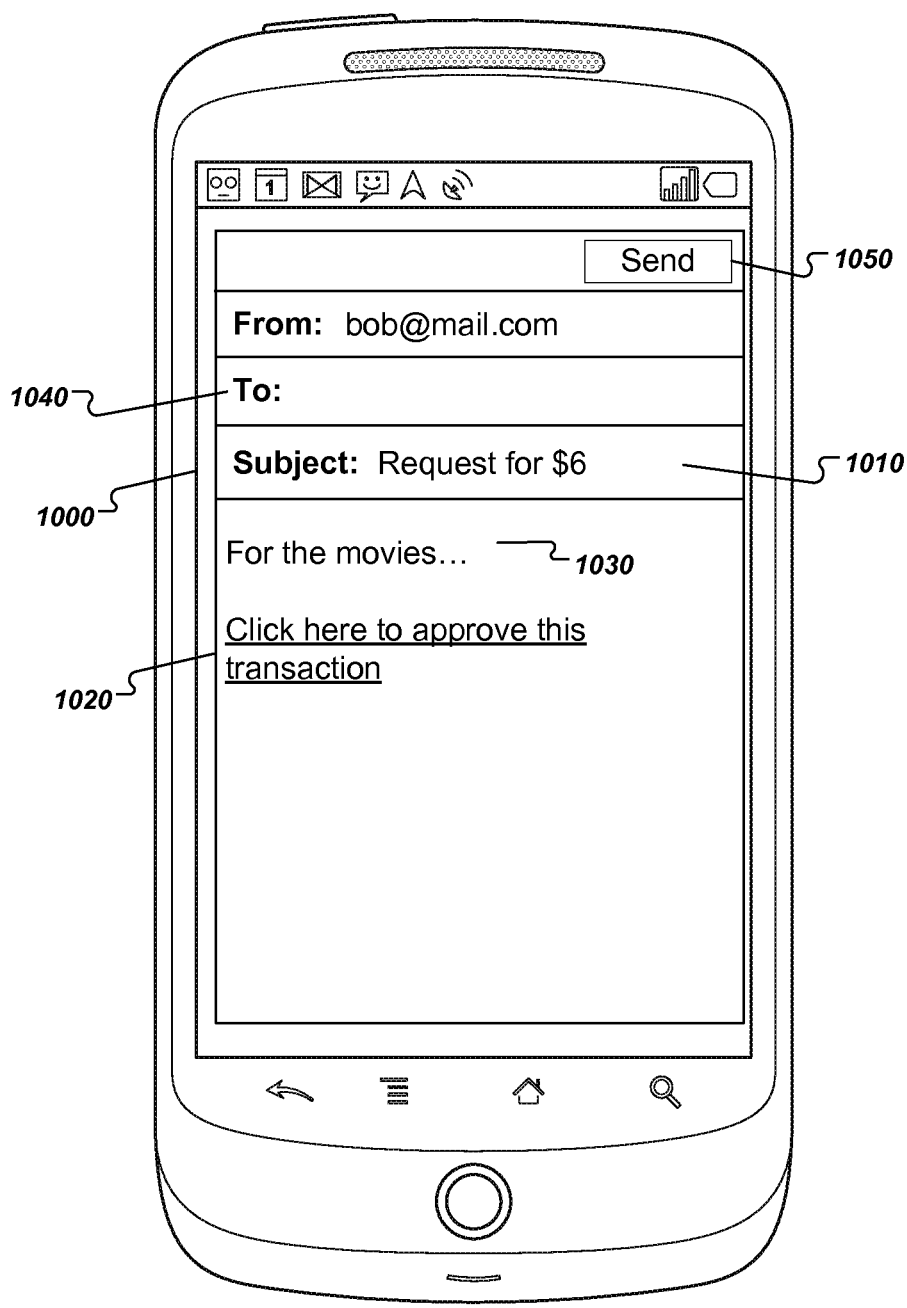
FIG. 10 illustrates an example user interface for editing a draft email message.

FIG. 10 illustrates an example user interface 1000 for editing a draft email message. The user interface 1000 can be generated by a user application installed on a user device, which may be an email application or an application for sending and requesting payments.

The user interface 1000 includes a draft email message that includes content 1010 identifying the payment amount. The draft email message also includes a confirmation link 1020 generated by the user application that the recipient can engage in order to initiate transfer of the requested payment amount.

The user can edit the draft email message, e.g., by entering text 1030 describing the request for the payment amount. The user can also edit the To field 1040 of the draft email message to specify a recipient email address.

Upon user selection of the send button 1050, the user device forwards the completed email message to an email server, which will forward the email message to the recipient email address entered by the user. Notably, the user does not need to log in to initiate the transfer using the draft email message.

Referring back to FIG. 8, the user device 810 sends the email message to an email server 820 (804). The email server 820 then forwards the email message on to a second user device 830 (806).

After user selection of the send button, the user device 810 sends a notification 808 of the requested transaction to a payment service system 840 (808). The notification need not be an email message, although the user device 810 can also notify the payment service system 840 by addressing the email message to the payment service system. Alternatively, the user device 810 can send the notification to the payment service system 840 before the user selects the send button, e.g., after generating the email message (802).

In some implementations, the email message including the confirmation link is generated by the payment service system 840 rather than by the user device 810. Thus, the payment service system 840 can send an email message 812 having the confirmation link to the email server 820, and the email server can forward the email message 814 to the user device 830.

The recipient associated with the user device 830 receives the email message that includes the confirmation link. The recipient engages the confirmation link to authorize the transfer of the requested payment amount to the user. The payment service system 840 receives the notification that the link was engaged (816). Upon receiving the notification that the confirmation link was engaged, the payment service system can initiate the transfer of the requested payment amount.

Figure 11:
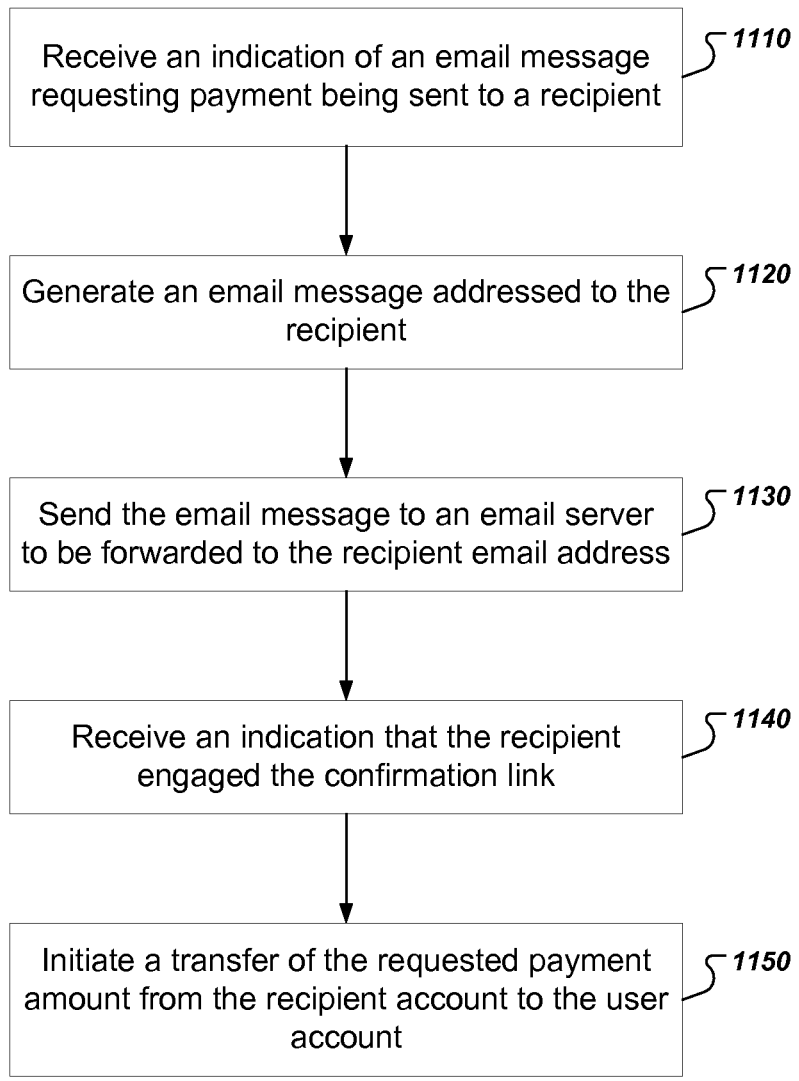
FIG. 11 is a flow chart of an example process for transferring a requested payment amount.

FIG. 11 is a flow chart of an example process for transferring a requested payment amount. In general, a payment service system receives a notification of a transaction of a requested payment amount from a first user device. The payment service system then generates an email message having a confirmation link and sends the email message to a recipient. The payment service system then initiates a transfer of the requested payment amount upon receiving an indication that the recipient of the email message engaged the confirmation link. The example process can be performed by an appropriately programmed payment service system of one or more computers.

The payment service system receives an indication of an email message requesting payment being sent to a recipient (1110). For example, a user requesting payment can use a user application installed on a user device to send an email message requesting payment to a recipient. The user application can then directly notify a payment service system of the email message requesting payment, e.g., by sending a direct network request rather than an email message.

The indication can include information including an email address of the sender or some other identifier of the sender, an email address of the recipient, and the requested payment amount.

If the indication is received from a user that does not yet have an account with the payment service system, the payment service system can interact with the user application to prompt the user to enter payment information, e.g., a debit card number or other bank information.

The payment service system generates an email message addressed to the recipient (1120). The generated email message includes a confirmation link that the recipient can engage to authorize the requested transaction. The generated email message may also include the payment amount in the subject or body of the email message. The payment amount can also be included in embedded content of the email message, e.g., in markup language code of the email message or included in an image embedded in the email message.

The payment service system sends the email message to an email server to be forwarded to the recipient email address (1130). Upon receiving the email message, the email server will forward the email message to the recipient at the indicated recipient email address.

Figure 12:
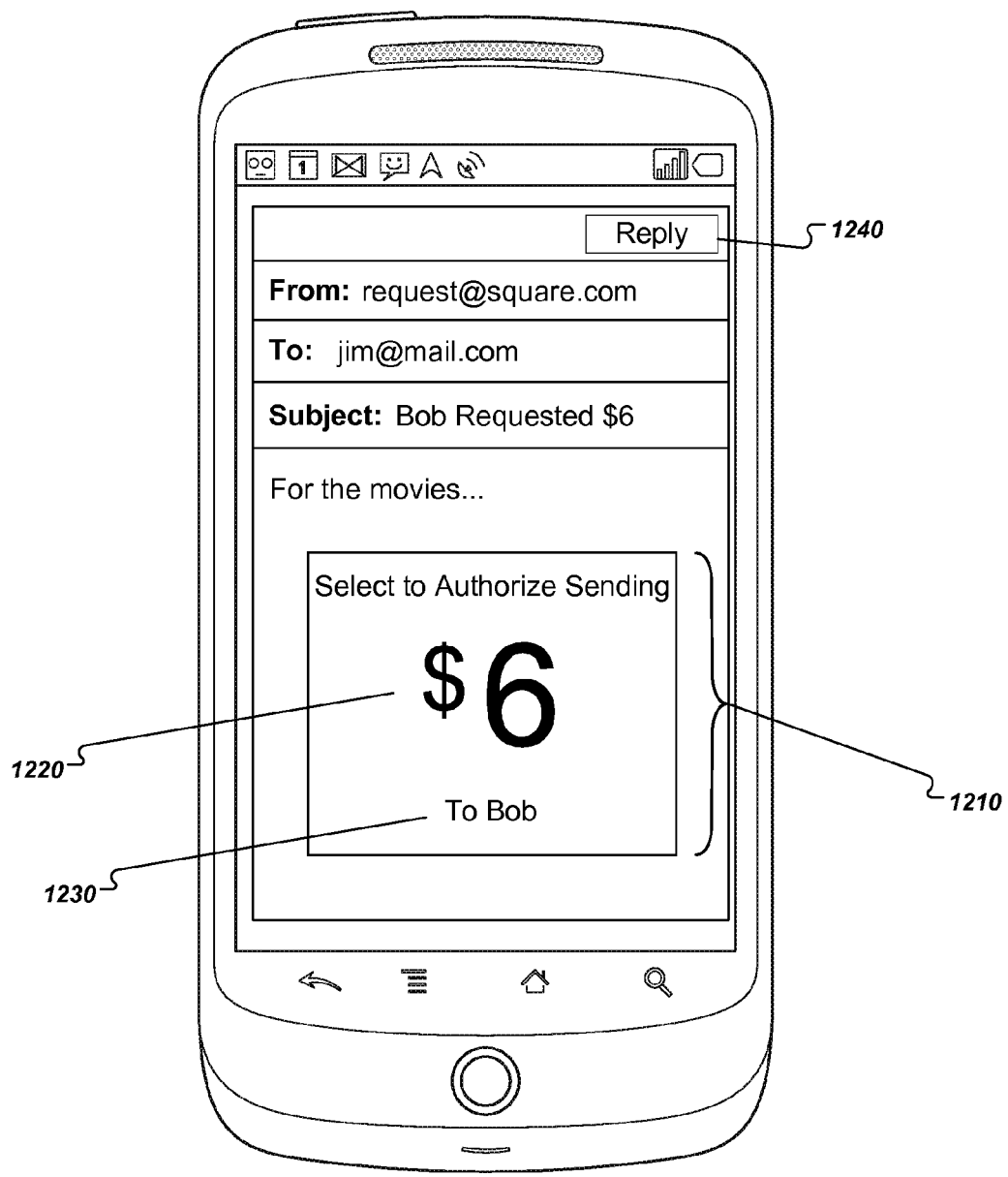
FIG. 12 illustrates an example email message generated by a payment service system.

FIG. 12 illustrates an example email message generated by a payment service system. The email message includes a selectable area 1210 that includes an indication of the requested payment amount 1220 and an indication of the requester 1230. Selection by the recipient of the selectable area 1210 will cause the user device to notify the payment service system that the recipient engaged the confirmation link.

Alternatively, the recipient can reply to the email message by selecting the reply button 1240, which can also act to authorize the payment service system to initiate the transfer of the requested payment amount.

Referring back to FIG. 11, the payment service system receives an indication that the recipient engaged the confirmation link (1140). The payment service system then initiates the transfer of the requested payment amount from the recipient account to the user account (1150).

If the recipient does not yet have an account with the payment service system, the payment service system can send another email to the recipient inviting the recipient to provide payment information for completing the requested transfer.

Figure 13:
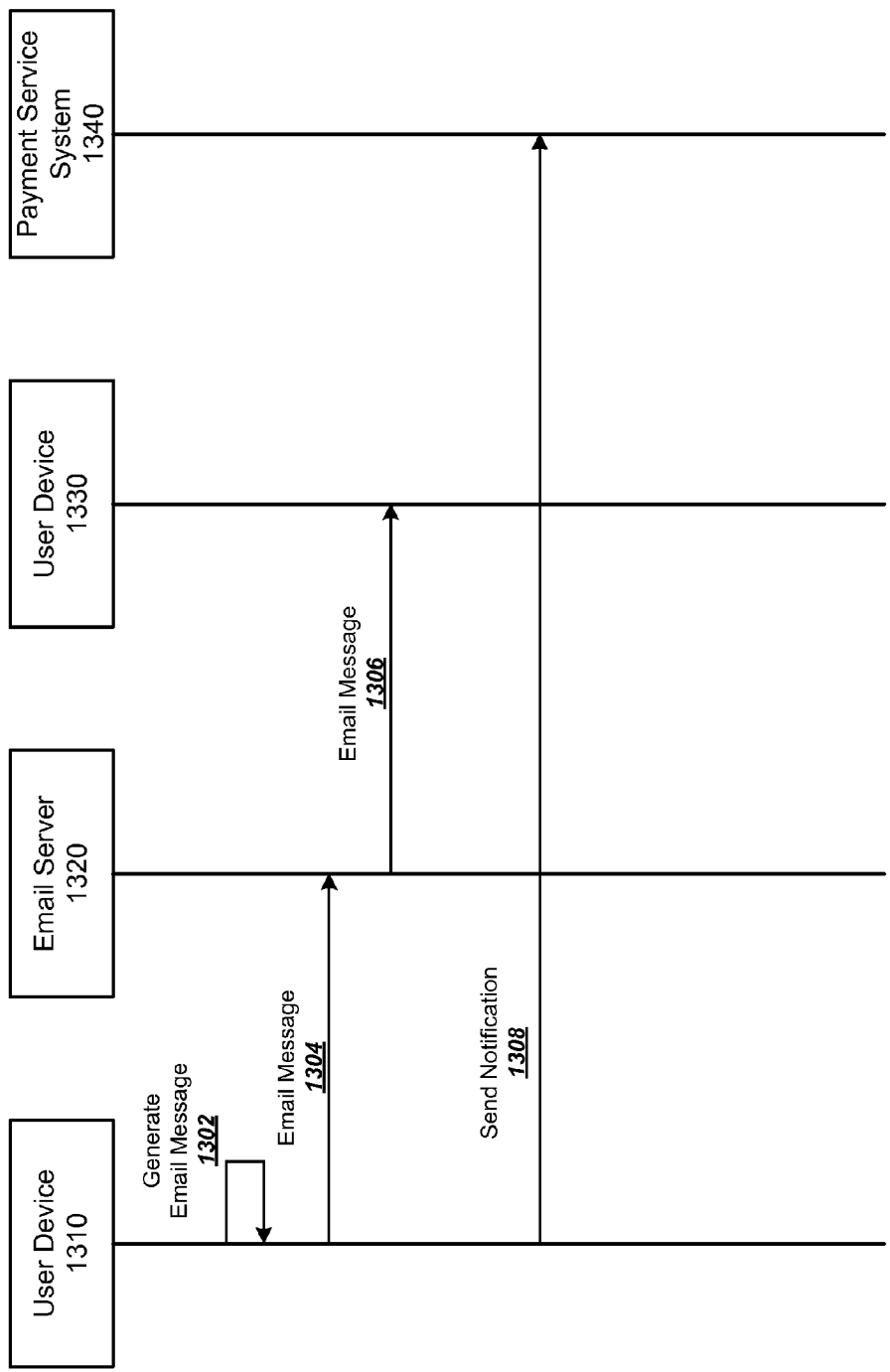
FIG. 13 is a sequence diagram of an example process for sending money using email.

FIG. 13 is a sequence diagram of an example process for sending money using email. In general, a user application installed on a user device 810 generates an email message 806 in response to user input of a requested payment amount. When a recipient of the email message engages a confirmation link in the email message, a payment service system 840 can transfer the requested payment amount between an account of the recipient and an account of the sender.

The user device 1310 generates an email message (1302). A user of the user device 1310 can use an interface to enter a payment amount using a user interface of a user application installed on the user device 1310. For example, the user can interact with the user interface illustrated in FIG. 9 by entering a payment amount and selecting the send button 920.

The user device 1310 sends the email message to an email service 1320 (1304). The email server 1320 then forwards the email message to a second user device 1330 (1306).

Either before or after sending the email message to the email server 1320, the user device 1310 sends a notification of the requested transaction to a payment service system 1340 (1308). The user device 1310 can send the notification 1308 in the background without requiring user input from the user. Furthermore, the payment service system 1340 need not require user input at all from a second user of the second user device 1330.

Thus, from the first user's perspective, the experience of sending payment to the second user is substantially similar to simply sending an email. Moreover, neither the first user nor the second user need to log in to the payment service system 1340 to complete the transaction.

Figure 14:
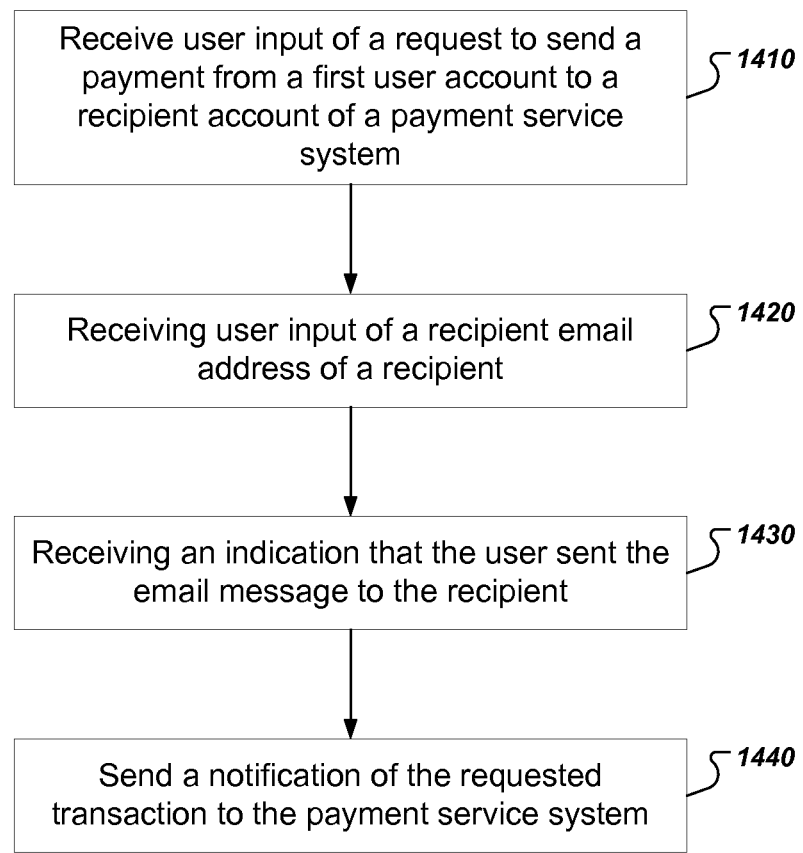
FIG. 14 is a flow chart of an example process for sending money using email.

FIG. 14 is a flow chart of an example process for sending money using email. In general, a user device generates and sends an email message to a recipient. The user device also notifies a payment service system of the transaction. The example process can be performed by an appropriately programmed system of one or more computers. The process will be described as being performed by a user device.

The user device receives user input of a request to send a payment from a first user account to a recipient account of a payment service system (1410), for example, as described above with reference to FIG. 9 and FIG. 13.

The user device receives user input of a recipient email address of a recipient (1420). The user can specify the recipient email message either directly in the user application or in a draft email message generated by an email application. The user device may also automatically generate portions of a draft email message, allowing the user to merely specify the recipient email address.

The user device receives an indication that the user sent the email message to the recipient (1430). The user application installed on the user device can obtain the recipient email address either as entered directly by the user or the user application can determine the recipient email address by accessing the sent email message. For example, the user application can request access to email messages that were sent by the user device in order to access the recipient email address.

The user device sends a notification of the requested transaction to the payment service system (1440). The user device may, but need not, send the notification as an email message. For example, the user device can send a direct network request, e.g., an HTTP request, to the payment service system in order to notify the payment service system about the requested transaction between the user and the recipient.

Figure 15:
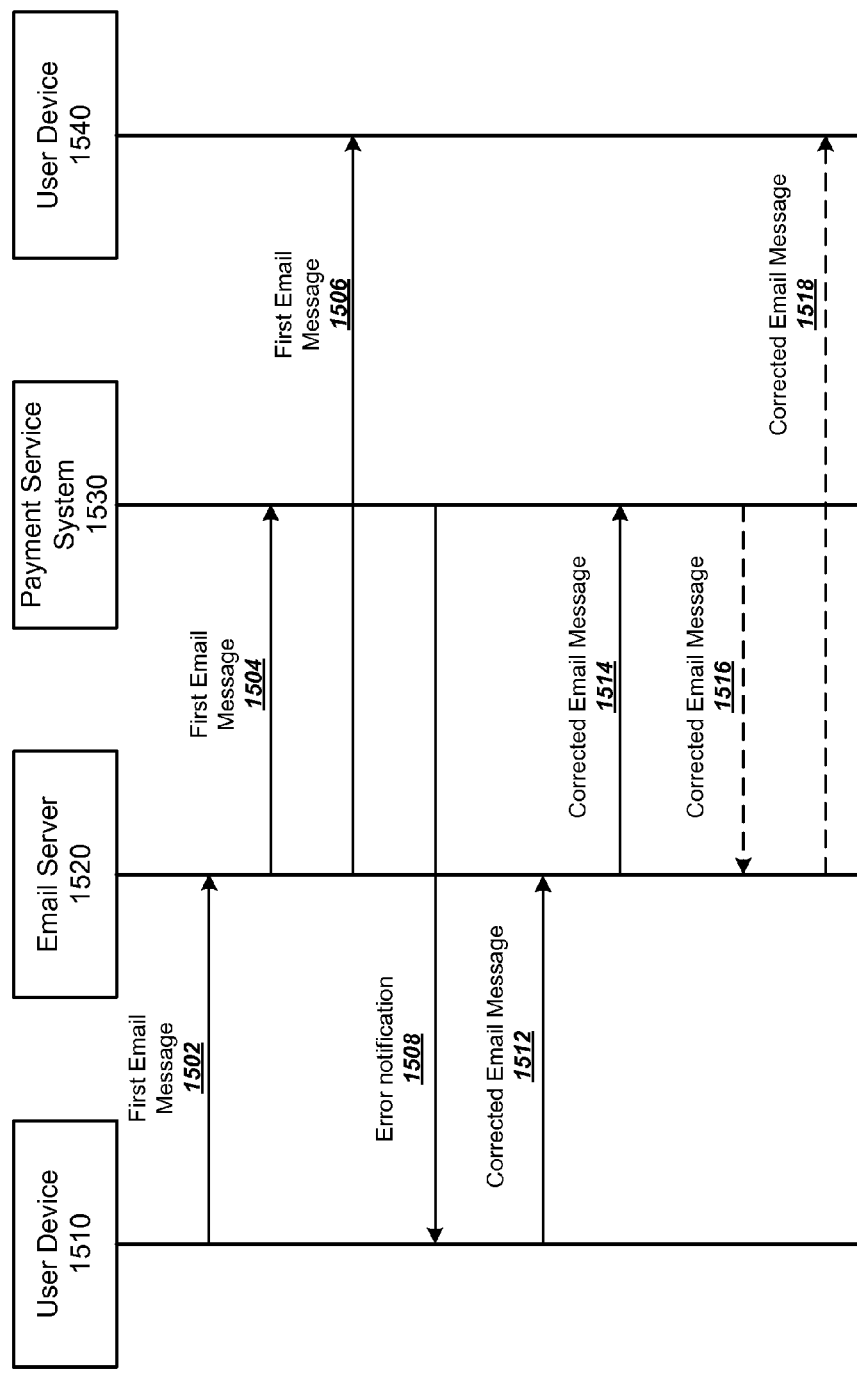
FIG. 15 is a sequence diagram of an example process of correcting errors.

FIG. 15 is a sequence diagram of an example process of correcting errors. A user of a first user device 1510 can send a first email message requesting money to be transferred between an account of the sender associated with an email address of the sender and an account of a recipient associated with an email address of the recipient. If the first email message includes errors, a payment service system 1530 can send a notification to the user, and the user can provide a corrected email message to correct the error. The payment service system can then process the originally requested transaction according to the corrected information.

The user device 1510 sends a first email message to an email server 1520 (1502), and the email server 1520 forwards the first email message to a payment service system 1530 (1504) and to a recipient user device 1540 (1506).

If the payment service system 1530 determines that the first email message includes errors, the payment service system 1530 sends an error notification to the first user device 1510 (1508).

The user can then use the first user device 1510 to send a corrected email message to the email server 1520 (1512), which forwards the corrected email message to the payment service system 1530 (1514).

The payment service system 1530 can then process the transaction using the corrected information. The payment service system 1530 can also optionally send a corrected email message to the email server 1520 (1516) to be forwarded on to the second user device 1540 (1518).

Figure 16:
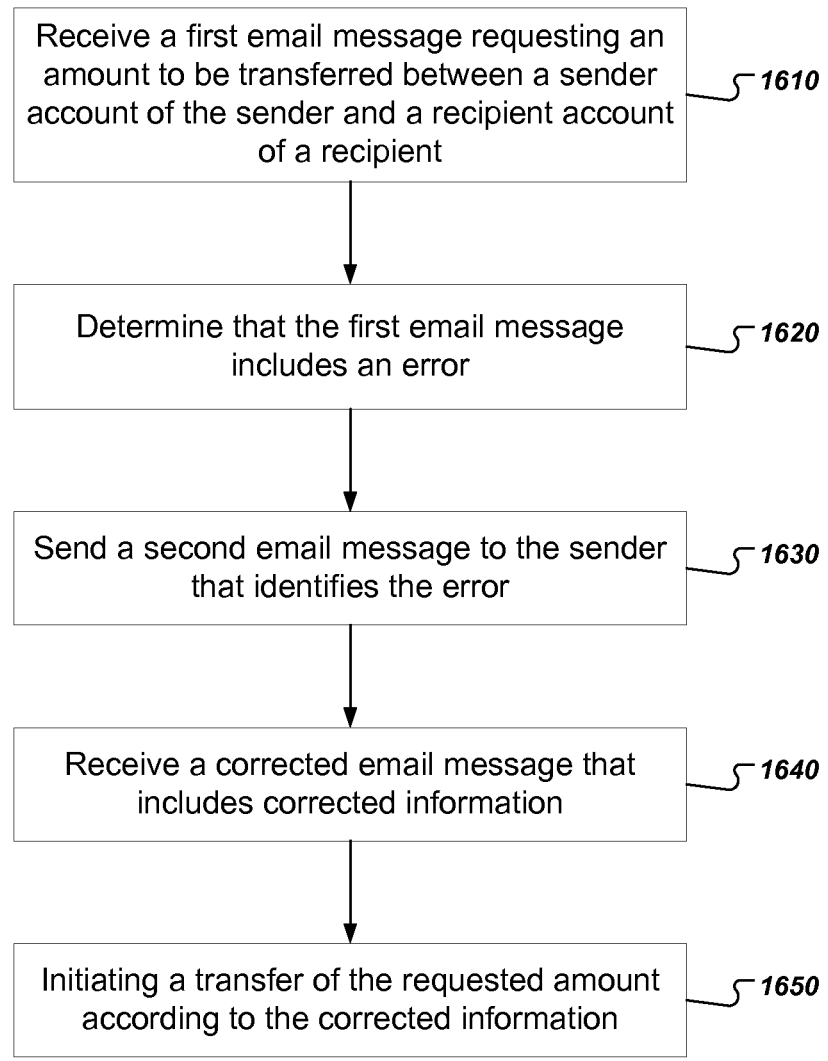
FIG. 16 is a flow chart of an example process for correcting a request to transfer money using email.

FIG. 16 is a flow chart of an example process for correcting a request to transfer money using email. In general, a payment service system notifies a sender of an error in an email message requesting a transfer between a sender account of the sender and a recipient account of a recipient of the email message. The sender can then send a corrected email that includes corrected information, and the payment service system can process the requested transfer using the corrected information. The example process can be performed by an appropriately programmed system of one or more computers. The process will be described as being performed by a payment service system.

The payment service system receives a first email message requesting an amount to be transferred between a sender account of the sender and a recipient account of a recipient (1610). The request can either be a request to send payment to the recipient or a request to receive payment from the recipient.

The payment service system determines that the first email message includes an error (1620). Errors can occur, for example, if the sender composes an email message from scratch in an email application instead of using a dedicated user application for generating draft email messages. Users may also accidentally alter a draft email message so that the email message includes an error.

For example, the email message may include multiple payment amounts that are inconsistent. The user may have entered a payment amount on the subject line of the email message, e.g., "Here's $5," but may have included a different payment amount in the body of the email message, e.g., "I'm paying you $6 for dinner last week." Thus the payment service system may determine that the two payment amounts are inconsistent and can invite the user to correct the error.

The first email message can include a number of other errors. For example, the specified payment amount may be out of a previously determined range. In other words, the requested payment amount may be too high or too low. For example, for some users there may be a maximum payment amount, and the error can be exceeding the maximum payment amount. The requested payment amount may also include syntax errors, e.g., unexpected letters or other symbols that render the payment amount ambiguous or invalid. The recipient email address specified by the first email message may also be of a recipient that is unknown, fraudulent, or blocked.

The payment service system sends a second email message to the sender that identifies the error (1630). For example, the second email message can invite the sender to provide corrected information for carrying out the requested transaction. In response, the sender can provide a corrected email message that includes a proper payment amount or a proper recipient. The payment service system then receives the corrected email message that includes the corrected information (1640).

In response to receiving the corrected email message, the payment service system initiates a transfer of the requested payment amount according to the corrected information.

If the request was a request for the recipient to pay the sender, the payment service system may wait for the recipient to engage a confirmation link in the first email message. The payment service system may also send a corrected email message to the recipient, which may include a corrected confirmation link.

Figure 17:
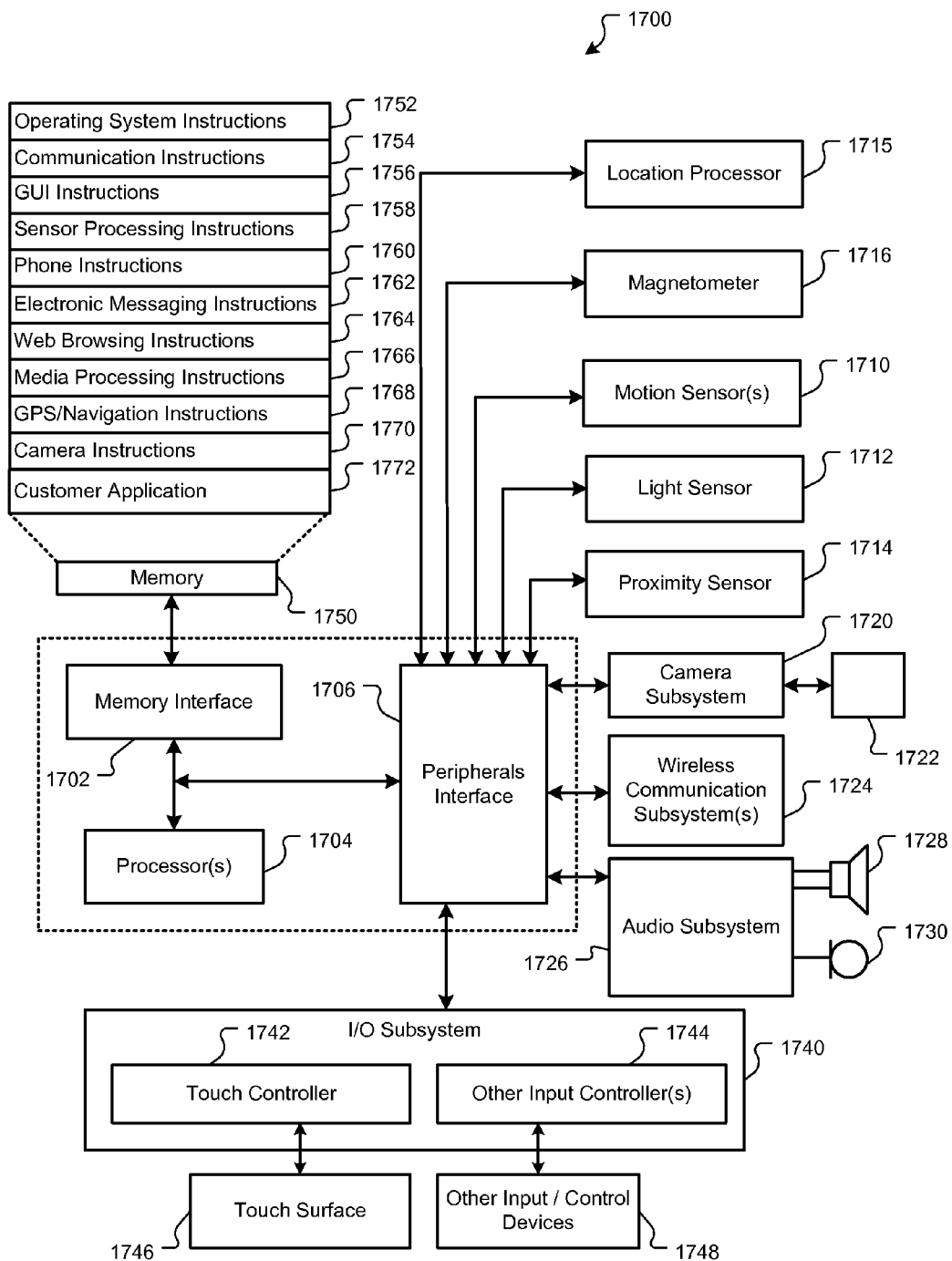
FIG. 17 is a block diagram of an exemplary architecture of a mobile device capable of emailing a recipient to transfer money.

FIG. 17 is a block diagram of an exemplary architecture of a mobile device capable of emailing a recipient to transfer money. At least one or more parts in the architecture 1700 can be implemented in any device for generating the features described in reference to FIGS. 1-16, including but not limited to portable or desktop computers, servers, smart phones and electronic tablets, television systems, game consoles, kiosks and the like. Architecture 1700 can include memory interface 1702, data processor(s), image processor(s) or central processing unit(s) 1704, and peripherals interface 1706. Memory interface 1702, processor(s) 1704 or peripherals interface 1706 can be separate components or can be integrated in one or more integrated circuits. The various components can be coupled by one or more communication buses or signal lines.

Sensors, devices, and subsystems can be coupled to peripherals interface 1706 to facilitate multiple functionalities. For example, motion sensor 1710, light sensor 1712, and proximity sensor 1714 can be coupled to peripherals interface 1706 to facilitate orientation, lighting, and proximity functions of the device. For example, in some implementations, light sensor 1712 can be utilized to facilitate adjusting the brightness of touch surface 1746. In some implementations, motion sensor 1710 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1706, such as a temperature sensor, a biometric sensor, or other sensing device, to facilitate related functionalities.

Location processor 1715 (e.g., GPS receiver) can be connected to peripherals interface 1706 to provide geo-positioning. Electronic magnetometer 1716 (e.g., an integrated circuit chip) can also be connected to peripherals interface 1706 to provide data that can be used to determine the direction of magnetic North. Thus, electronic magnetometer 1716 can be used as an electronic compass.

Camera subsystem 1720 and an optical sensor 1722, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1724. Communication subsystem(s) 1724 can include one or more wireless communication subsystems. Wireless communication subsystems 1724 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1724 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 1702.x communication networks (e.g., WiFi, WiMax, or 3G networks), code division multiple access (CDMA) networks, and a Bluetooth™ network. Communication subsystems 1724 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1726 can be coupled to a speaker 1728 and one or more microphones 1730 to facilitate voice-enabled functions, such as voice recognition, voice replication, digital recording, and telephony functions.

I/O subsystem 1740 can include touch controller 1742 and/or other input controller(s) 1744. Touch controller 1742 can be coupled to a touch surface 1746. Touch surface 1746 and touch controller 1742 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1746. In one implementation, touch surface 1746 can display virtual or soft buttons and a virtual keyboard, which can be used as an input/output device by the user.

Other input controller(s) 1744 can be coupled to other input/control devices 1748, such as one or more buttons, rocker switches, thumb-wheel, infrared port, USB port, and/or a pointer device such as a stylus. The one or more buttons (not shown) can include an up/down button for volume control of speaker 1728 and/or microphone 1730.

In some implementations, device 1700 can present recorded audio and/or video files, such as MP3, AAC, and MPEG files. In some implementations, device 1700 can include the functionality of an MP3 player and may include a pin connector for tethering to other devices. Other input/output and control devices can be used.

Memory interface 1702 can be coupled to memory 1750. Memory 1750 can include high-speed random access memory or non-volatile memory, such as one or more magnetic disk storage devices, one or more optical storage devices, or flash memory (e.g., NAND, NOR). Memory 1750 can store operating system 1752, such as Darwin, RTXC, LINUX, UNIX, OS X, WINDOWS, or an embedded operating system such as VxWorks. Operating system 1752 may include instructions for handling basic system services and for performing hardware dependent tasks. In some implementations, operating system 1752 can include a kernel (e.g., UNIX kernel).

Memory 1750 may also store communication instructions 1754 to facilitate communicating with one or more additional devices, one or more computers or servers. Communication instructions 1754 can also be used to select an operational mode or communication medium for use by the device, based on a geographic location (obtained by the GPS/Navigation instructions 1768) of the device. Memory 1750 may include graphical user interface instructions 1756 to facilitate graphic user interface processing; sensor processing instructions 1758 to facilitate sensor-related processing and functions; phone instructions 1760 to facilitate phone-related processes and functions; electronic messaging instructions 1762 to facilitate electronic-messaging related processes and functions; web browsing instructions 1764 to facilitate web browsing-related processes and functions and display GUIs; media processing instructions 1766 to facilitate media processing-related processes and functions; GPS/Navigation instructions 1768 to facilitate GPS and navigation-related processes; camera instructions 1770 to facilitate camera-related processes and functions; and instructions 1772 for emailing a recipient to transfer money. The memory 1750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1750 can include additional instructions or fewer instructions. Furthermore, various functions of the mobile device may be implemented in hardware and/or in software, including in one or more signal processing and/or application specific integrated circuits.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of transferring money based on content of email messages transmitted to a payment service system over a network, the method comprising:
   causing a processor executing on a user device associated with a sender to invoke a user application in response to receiving input indicative of a request to initiate the user application being received at the user device;
   causing the user device to automatically generate a first email message in response to the sender requesting a transfer of funds via the user application, wherein the first email message includes pre-populated information entered by the sender through the user application;
   receiving, at the payment service system and from the user device, the first email message requesting an amount to be transferred between a sender account of the payment service system of the sender of the first email message and a recipient account of the payment service system of a recipient of the first email message, wherein the first email message includes the requested amount to be transferred and an identification of a recipient email address of the recipient;
   determining, by the payment service system, whether the first email message includes an error that prevents the transfer of the requested amount from being completed;
   in response to determining that the first email message includes an error,
      generating, by the payment service system, a second email message that includes information that identifies the error and a request to generate a corrected email message by the user device, wherein the corrected email message includes corrected information that rectifies the error;
      sending, by the payment service system, the second email message to a sender email address of the sender;
   receiving, at the payment service system and from the user device associated with the sender, the corrected email message that includes the corrected information;
   sending, by the payment service system, a confirmation email message to the sender that includes a confirmation link generated by the payment service system, wherein the confirmation link is encoded with the sender email address and the recipient email address;
   determining, by the payment service system, whether the sender selected the confirmation link in the confirmation email message by monitoring whether an indication of confirmation link selection has been received at the payment service system from the user device; and
   in response to determining the sender selected the confirmation link,
      initiating, by the payment service system, the transfer of the requested amount according to the corrected information, wherein said initiating includes identifying the sender account of the sender, identifying the recipient account of the recipient, and transferring the requested amount between the sender account of the sender and the recipient account of the recipient.

2. The method of claim 1, further comprising:
   sending, by the payment service system, a second corrected email message to the recipient email address, the second corrected email message having the corrected information.

3. The method of claim 1, wherein determining that the first email message includes an error comprises determining that the recipient does not have an account with the payment service system.

4. The method of claim 1, wherein determining that the first email message includes an error comprises determining that the requested amount is not a valid amount.

5. The method of claim 4, wherein determining that the first email message includes an error comprises determining that the requested amount is not within a valid range.

6. The method of claim 4, wherein determining that the first email message includes an error comprises determining that the requested amount has a syntax error.

7. The method of claim 1, wherein determining that the first email message includes an error comprises determining that the first email message includes inconsistent data.

8. The method of claim 1, wherein determining that the first email message includes an error comprises determining that a discrepancy exists in the first email message between two separate instances specifying the requested amount.

9. The method of claim 1, wherein the pre-populated data includes the requested amount, the recipient email address, or both.

10. The method of claim 1, wherein the first email message and the corrected email message are addressed to a service email address of the payment service system.

* * * * *